(12) United States Patent
Lee et al.

(10) Patent No.: US 10,838,129 B2
(45) Date of Patent: Nov. 17, 2020

(54) METASURFACE ON OPTICAL FIBER AND RELATED METHOD

(71) Applicant: BAYLOR UNIVERSITY, Waco, TX (US)

(72) Inventors: Ho Wai Howard Lee, Waco, TX (US); Jingyi Yang, Waco, TX (US); Indra Ghimire, Waco, TX (US)

(73) Assignee: Baylor University, Waco, TX (US)

( * ) Notice: Subject to any disclaimer, the term of this patent is extended or adjusted under 35 U.S.C. 154(b) by 0 days.

(21) Appl. No.: 16/443,941

(22) Filed: Jun. 18, 2019

(65) Prior Publication Data

US 2019/0383982 A1    Dec. 19, 2019

Related U.S. Application Data

(60) Provisional application No. 62/686,765, filed on Jun. 19, 2018.

(51) Int. Cl.
*G02B 6/024*    (2006.01)
*G02F 1/313*    (2006.01)
(Continued)

(52) U.S. Cl.
CPC .......... *G02B 6/0008* (2013.01); *G02B 1/002* (2013.01); *G02B 6/001* (2013.01); *G02B 6/024* (2013.01);
(Continued)

(58) Field of Classification Search
CPC .... G02B 6/0008; G02B 6/001; G02B 6/0035; G02B 6/024; G02B 6/262; G02B 1/002; G02F 1/00; G02F 2001/294
See application file for complete search history.

(56) References Cited

U.S. PATENT DOCUMENTS 8,848,273 B2* 9/2014 Yu .......................... H01Q 15/10
                                                          359/238
9,995,859 B2* 6/2018 Kamali ................ G02B 5/0263
(Continued)

FOREIGN PATENT DOCUMENTS

WO    2013033591 A1    3/2013
WO    2016126896 A1    8/2016
(Continued)

OTHER PUBLICATIONS

Patrizio Vaiano et al., "Lab on Fiber Technology for biological sensing applications", Nov. 22, 2016, Laser & Photonics Reviews, vol. 10 Issue 6, pp. 922-961 (attached abstract only). (Year: 2016).*
(Continued)

*Primary Examiner* — Daniel Petkovsek
(74) *Attorney, Agent, or Firm* — Jackson Walker, LLP

(57) ABSTRACT

The present disclosure provides a system and method for an ultrathin optical metasurface with an array patterning formed on an optical fiber facet that enables manipulation of light passing therethrough, such as focusing and steering the light, and controlling a polarization state of light. The patterning can be non-uniform to selectively direct light passing through the metasurface. Array structures can vary in size, angle, shapes, and other non-uniform aspects. Further, the array can include materials that can be electrically activated and controlled to variably tune the metasurface characteristics for increased ability to manipulate the light passing therethrough. The materials can include a conductor, a dielectric, or a composite of a conductor, insulator, and dielectric formed on the optical fiber. The integration of an ultrathin metasurface and optical fiber can provide practical applications in optical imaging and sensing, optical communications, high power lasers, beam steering, color filters, and other applications.

25 Claims, 17 Drawing Sheets

(51) Int. Cl.
  *F21V 8/00* (2006.01)
  *G02B 1/00* (2006.01)
  *G02B 6/26* (2006.01)
  *G02F 1/29* (2006.01)
  *G02F 1/00* (2006.01)

(52) U.S. Cl.
  CPC ........... *G02B 6/262* (2013.01); *G02F 1/3132* (2013.01); *G02F 1/00* (2013.01); *G02F 2001/294* (2013.01)

(56) References Cited

U.S. PATENT DOCUMENTS

| | | | |
|---|---|---|---|
| 2016/0306079 A1* | 10/2016 | Arbabi | G02B 5/0263 |
| 2016/0341859 A1 | 11/2016 | Shvets et al. | |
| 2018/0045953 A1 | 2/2018 | Fan et al. | |

FOREIGN PATENT DOCUMENTS

| | | | | |
|---|---|---|---|---|
| WO | WO-2018208774 A1 | * | 11/2018 | ........... A61B 5/0075 |
| WO | WO-2019118646 A1 | * | 6/2019 | ............... A61B 5/00 |

OTHER PUBLICATIONS

M. Principe et al. "Meta-tips for lab-on-fiber optrodes", Sixth European-Workshop on Optical Fibre Sensors, Intl. Society for Optics and Photonics, May 30, 2016, vol. 9916, pp. 1-4. (Year: 2016).*

Moroz, A., International Search Report for International Patent Application No. PCT/US2019/037605, dated Aug. 4, 2019, European Patent Office.

Moroz, A., Written Opinion for International Patent Application No. PCT/US2019/037605, dated Aug. 4, 2019, European Patent Office.

"An Introduction to Polarization Directed Flat Lenses", Edmond Optics, Inc., 2016, 16 pages.

\* cited by examiner

METASURFACE ON OPTICAL FIBER AND RELATED METHOD

CROSS REFERENCE TO RELATED APPLICATIONS

This application claims the benefit of U.S. Provisional Ser. No. 62/686,765, filed on Jun. 19, 2018, and is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to optical fiber. More specifically, the disclosure relates to metasurfaces formed on optical fiber.

Description of the Related Art

Optical fiber is a well-established efficient way to guide and manipulate light and allowing high bandwidth optical transmission for long-distance communication with low attenuation. Although a dielectric optical waveguide is efficient for transmitting light, its functionality is limited by the dielectric properties of the core's and cladding's materials (e.g. Ge doped-silica and silica glasses). The light passing through the optical fiber is typically diverging, so the light intensity decreases significantly after exiting the optical fiber. A numerical aperture is determined by the refractive index of the fiber materials.

Besides being used for optical communication purposes, conventional optical fibers have been used for fiber lasers, remote and optical sensing, fiber imaging and endoscopes, and fiber laser surgery. However, the optical properties of the optical fiber waveguide such as phase, amplitude, polarization state, and mode profile, cannot be altered in optical fibers after the fiber drawing fabrication. In addition, the spot size of the transmitted light is diverging, and the spot size is limited by the diffraction limit of the dielectric core.

Attempts have been made to fabricate plasmonic/nanostructures on the optical fiber facets to alter and enhance the optical properties of the fibers, as elements of the structures can interact directly with a well-guided spatial mode within the optical fiber. Compact optical components such as diffraction grating and plasmonic sensors have been realized with periodical metallic nanostructures (i.e., uniform slits, holes, or bars) on facets of conventional fibers. A method to apply a metallic structure to a polymeric membrane on the facet of a hollow core photonic crystal fiber ("PCF") has been functionalized as a nanoplasmonic filter. This methodology provides integration with different types of optical fiber. However, these in-fiber plasmonic lenses suffer from low transmission efficiency, narrow operation wavelength, and complicated fabrication and design, thus limiting their potential practical applications.

Furthermore, an external electro-optical device (e.g. Lithium Niobate modulator) is currently needed for optical fiber signal modulation. However, those external modulators are bulky and expensive, and they induce significant insertion losses. Some other materials have been used in the optical fiber cladding for high dynamic range and low loss optical modulation, such as liquid crystal, ferroelectric crystal, magnetic fluid, and graphene. However, structures with these materials are difficult to fabricate, have a small modulation range due to the weak light-matter interaction, have a slow modulation speed, and require different external stimuli, such as thermal heating or magnetic fields, that are not completely compatible with optical fiber systems.

BRIEF SUMMARY OF THE INVENTION

The present disclosure provides a system and method for an ultrathin optical metasurface with an array patterning formed on an optical fiber facet that enables manipulation of light passing therethrough, such as focusing and steering the light, and controlling a polarization state of light. The patterning can be non-uniform to selectively direct light passing through the metasurface. Array structures can vary in size, angle, shapes, and other non-uniform aspects. Further, the array can include materials that can be electrically activated and controlled to variably tune the metasurface characteristics for increased ability to manipulate the light passing therethrough. The materials can include a conductor, a dielectric, or a composite of a conductor, insulator, and dielectric formed on the optical fiber. The integration of an ultrathin metasurface and optical fiber can provide practical applications in optical imaging and sensing, optical communications, high power lasers, beam steering, color filters, and other applications.

The present disclosure provides an optical fiber having a facet, comprising a metasurface coupled on the facet of the optical fiber, the metasurface having a metasurface array of a plurality of metasurface elements, the metasurface elements arranged at a plurality of rotational angles relative to a datum, wherein light that passes through the optical fiber can pass through the metasurface elements at a rotational angle of the respective metasurface element.

The present disclosure also provides an optical fiber having a facet, comprising a metasurface coupled on the facet of the optical fiber, the metasurface having a metasurface array of a plurality of metasurface elements through which light from the optical fiber can pass, the metasurface configured to respond to applied voltage to tune characteristics of the light that passes through the metasurface elements.

The present disclosure further provides a method of changing incident light exiting from an optical fiber comprising: allowing light to pass through a metasurface having a plurality of metasurface elements formed on a facet of the optical fiber; and changing a characteristic of the light that passes through the metasurface elements compared to the light immediately prior to the metasurface elements.

DETAILED DESCRIPTION

Figure 1A:
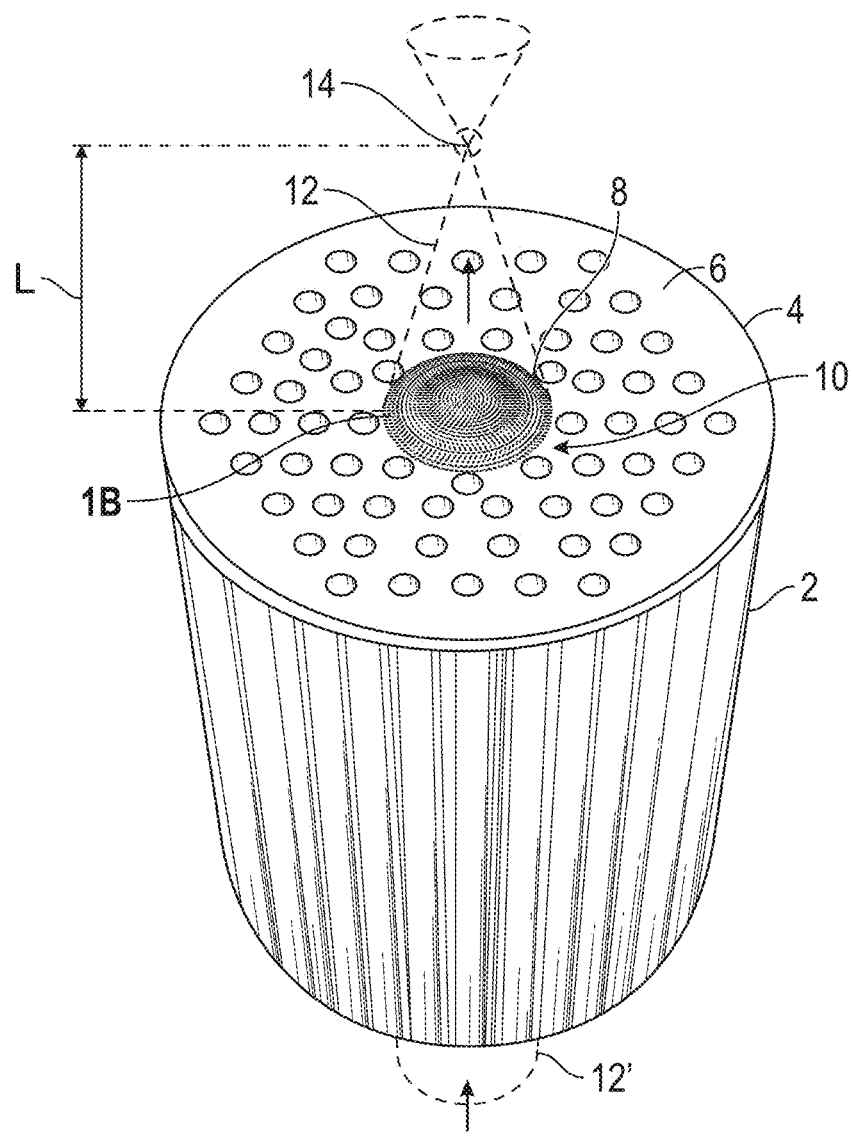
FIG. 1A is a schematic perspective view of an illustrative optical fiber with a metasurface formed thereon.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up", "upward", "bottom", "down", "downwardly", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments are disclosed that use various element numbers for like elements.

The present disclosure provides a system and method for an ultrathin optical metasurface with an array patterning formed on an optical fiber facet that enables manipulation of light passing therethrough, such as focusing and steering the light, and controlling a polarization state of light. The patterning can be non-uniform to selectively direct light passing through the metasurface. Array structures can vary in size, angle, shapes, and other non-uniform aspects. Further, the array can include materials that can be electrically activated and controlled to variably tune the metasurface characteristics for increased ability to manipulate the light passing therethrough. The materials can include a conductor, a dielectric, or a composite of a conductor, insulator, and dielectric formed on the optical fiber. The integration of an ultrathin metasurface and optical fiber can provide practical applications in optical imaging and sensing, optical communications, high power lasers, beam steering, color filters, and other applications.

FIG. 1A is a schematic perspective view of an illustrative optical fiber with a metasurface formed thereon. In general, and optical fiber 2 is formed with an end face, commonly called a "facet" 4. The facet is generally perpendicular to the longitudinal axis of the optical fiber. Some optical fibers are formed with hollow channels 6 running along the fiber and are known as a photonic crystal fiber ("PCF") or microstructured fiber. In a solid core PCF, a core 10 has a higher average refractive index than microstructured surrounding material, known as "cladding", and the light can be trapped and guided in the core of the solid core PCF due to modified total internal reflection. The optical properties can be manipulated by designing the desired glass-air structures, due to the unique holey structure and the guiding mechanism of PCFs. For illustration of the principles disclosed herein, PCFs are shown and disclosed, although other optical fibers are possible with the present invention. (Insert additional material discussion).

A metasurface 8 can be formed on the optical fiber 2, particularly on the facet 4. Light 12' passing generally through the core 10 of the optical fiber and through the facet can be manipulated by the metasurface as light 12, as the light passes through the metasurface. (Other ports and light passing through the optical fiber can be similarly manipulated using the teachings herein.) The metasurface 8 can be formed of at least a portion of conductive material, such as gold, conductive oxides such as transparent conducting oxides ("TCO"), metallic nitrides, or other materials, some of which are described in more detail herein. The metasurface 8 include a metasurface array 16 of metasurface elements 18 that can be subwavelength. In at least one embodiment, the metasurface 8 can be formed to produce a focusing light in the fiber facet by a geometrical arrangement of the metasurface array 16. The light that normally disperses rapidly can be manipulated and controlled, so that it can become a highly intense, focused light at a focal point 14 at a given focal length L. The metasurface elements 18 can be configured to control the phase and amplitude of the transmitted, reflected, and scattered light that ultimately emanates from the metasurface formed on the facet, such as by passing through the metasurface elements. The distribution of phase retardation for the metasurface array can be characterized as $$\varphi(r, \lambda) = -\frac{2\pi}{\lambda}\left(\sqrt{r^2 + f^2} - f\right) \tag{1}$$

where r is the distance from current location on the metasurface array to the center, f is the focal length, and $\lambda$ is the operation wavelength. With such a phase profile, the incident plane wave fronts are transformed into spherical ones, which converge at the focal length. A fixed operation wavelength $\Delta$, $\varphi(r, \lambda)$ in Eq. (1) can be acquired by exploiting the geometric phase as the phase modulation in each metasurface element. The geometric phase is generated from the rotation of the resonant metasurface elements 18 with circularly-polarized incident light. Advantageously, the metasurface can be formed on a relatively large mode area ("LMA") PDF optical fiber that has a large core, such as LMA-25 made of pure silica with a core diameter of 25±1 µm. The large core area of PCF allows more metasurface elements 8 (such as 1000+) to be fabricated on the metasurface array 16, providing a phase profile for achieving focusing functionality over conventional single mode fiber.

The metasurface 8 can refract and focus light in unique ways to provide the opportunity for advanced light manipulation and development of novel applications. The metasurface is generally flat with a typical thickness of less than 100 nanometers (nm). Conventional three-dimensional optical elements such as prisms or lenses can be replaced by flat, low-profile, and low-cost metasurface versions. The metasurface can enable ultrathin optical components such as flat lenses including diverging and focusing lenses, wave plates, holographic surfaces, filters and amplifiers, linear polarizers, orbital angular momentum manipulation and detection devices over a broad range of the electromagnetic spectrum. By controlling the phase shift and amplitude change imposed by the metasurface elements, the metasurface array can enable various optical applications such as wavefront engineering, radiation pattern tailoring, non-reciprocal magneto-optical effects, beam steering, and nonlinear ultrafast optical switching, among others. As disclosed herein, some embodiments of the metasurface can be tunable, so that the metasurface performance characteristics change with input, such as a power source coupled to the metasurface elements. The tunable embodiments can include conducting oxide and/or metallic nitride materials. In at least one embodiment, the tunable elements can include gate tunable conducting oxide metasurface elements that enable dynamic electrical control of the phase and amplitude of the reflected/refracted light.

Figure 1B:
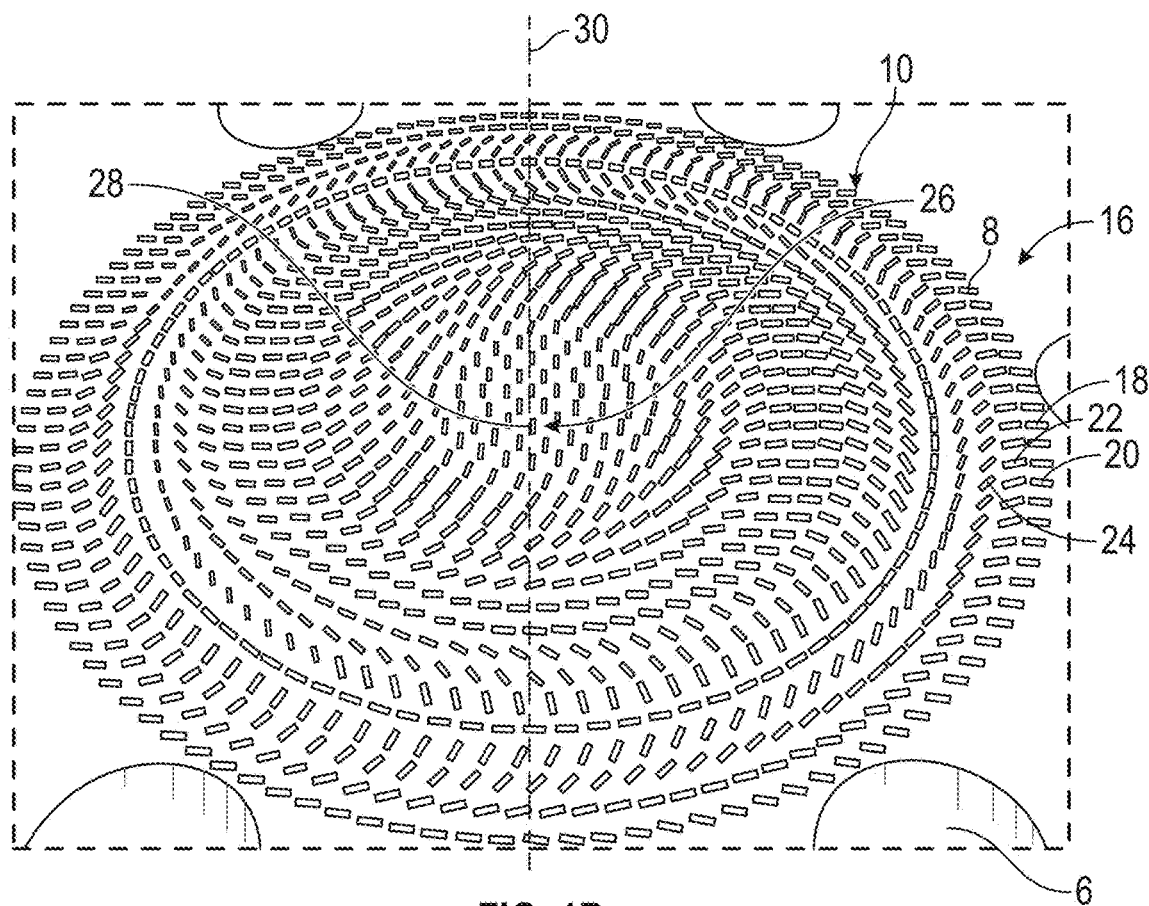
FIG. 1B is a schematic perspective view of an enlargement of a portion of the metasurface in FIG. 1A showing an illustrative metasurface pattern of metasurface elements.

FIG. 1B is a schematic perspective view of an enlargement of a portion of the metasurface in FIG. 1A showing an illustrative metasurface pattern of metasurface elements. The metasurface 8 is formed in an exemplary array 16. Continuous single mode guiding of the light passing through the core can be maintained in the optical fiber with a broad wavelength range, and the light is confined mostly within the core region. The metasurface array is designed to correspond to the core size to allow light passing through the core in the guided core mode to interact with the entire metasurface. The array can include numerous patterns, such as in this example circular rows, of metasurface elements positioned at various angles relative to a datum 30. The datum 30 can be an orthogonal or radial, so that relative angles and positions can differentiate between the various metasurface elements. In the particular example of FIG. 1B, a first array row 20 has a series of metasurface elements 18 at a constant angular position relative to a datum 30, irrespective of its position in the ring. Similarly, a second array row 22 is formed inward from the first array row 20 and with a plurality of metasurface elements at a constant angular position relative to the datum 30 but different than the elements in the first array row 20. A further array row, third array row 24, is formed inward from the second array row 22 and with a plurality of metasurface elements in a constant angular position relative to the datum 30, but different than the elements in the first and second array rows. In this embodiment, the array rows can continue in a radial spacing inward toward the center of the metasurface array 16 until a center 26 is reached, that can also include a metasurface element at some desired angle, including 0°, relative to the datum 30. The illustrated embodiment is not limiting and can include, for example, different patterns of the elements, different angles of the elements within a given pattern rather than being a constant angle relative to the datum, different sizes, different shapes, different spacing, and other uniform or nonuniform variations.

Figure 1C:
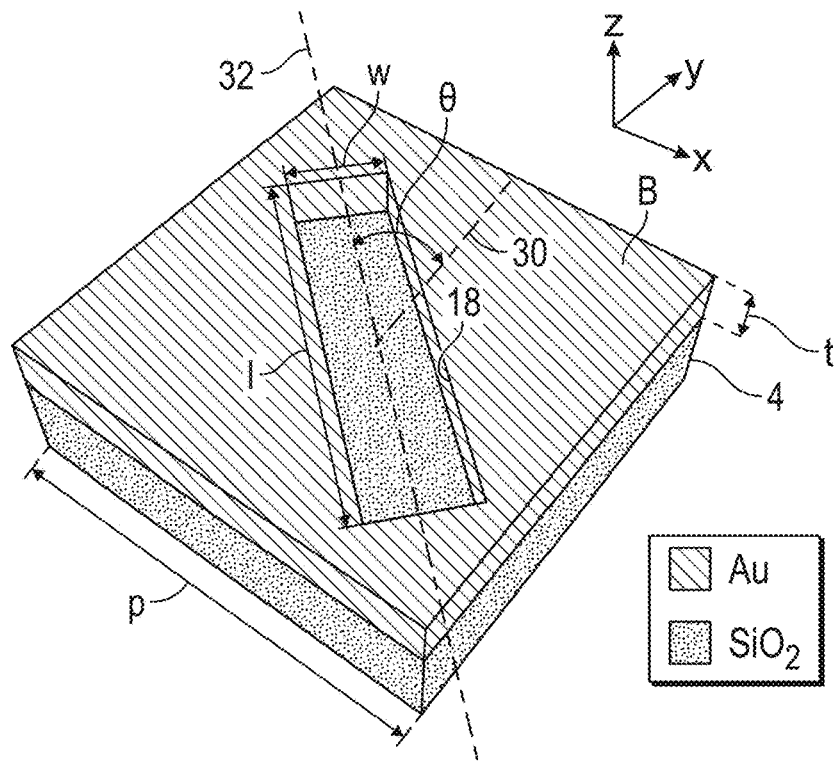
FIG. 1C is a schematic perspective view of an enlargement of metasurface element of the metasurface array in FIG. 1B.

FIG. 1C is a schematic perspective view of an enlargement of metasurface element of the metasurface array in FIG. 1B. The metasurface element 18 can be formed in, through, or on the metasurface 8 having a thickness "t", generally at the facet. In the illustrated embodiment, the metasurface element 18 is formed as an aperture through the metasurface 8, such as by etching through a gold layer that is deposited on the facet silicon dioxide material of the optical fiber core. The metasurface element can have a width "w" and a length "l" with a depth "t" with an angle θ along some reference line 32 of the element, such as a length (or width or other structural reference), relative to a datum 30, as discussed herein. Adjacent metasurface elements can have a periodicity spacing of "p".

Figure 2:
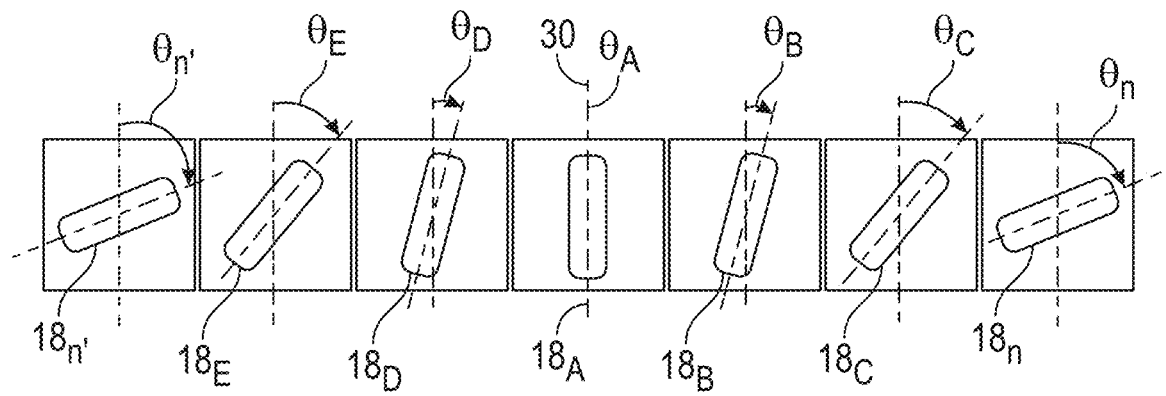
FIG. 2 is a schematic view of an embodiment of a metasurface array of elements at illustrative rotational angles relative to a datum for right-hand circular polarization to left-hand circular polarization.

FIG. 2 is a schematic view of an embodiment of a metasurface array of elements at illustrative angles θ relative to a datum for right-hand circular polarization ("RCP") to left-hand circular ("LCP") polarization. In this example of a metasurface array 16, a longitudinal axis of metasurface element 18A can be used to establish a datum 30 to define a rotational angle θA of zero. Metasurface element 18A can represent a metasurface element at the center 28 in FIG. 1B. The rotation direction of angle θ determines whether the light will focus for RCP to LCP or LCP to RCP. For purposes herein, a positive angle θ corresponds to a rotation direction of counterclockwise to converge light for LCP to RCP. In the following example, the metasurface elements are rotated in a clockwise direction with a negative angle θ, so the metasurface array focuses the light for RCP (incident light) to LCP (output light). Progressing to the right of metasurface element 18A, a row of metasurface elements represented by element 18B can be formed at an alignment angle θB that can be measured between a line that is parallel to the datum 30 and a longitudinal axis of element 18B. In this embodiment, angle θB is different than angle θA for element 18A. Another row of metasurface elements represented by element 18C can be formed at an angle ° C. that can be measured between a line that is parallel to the datum 30 and a longitudinal axis of element 18C. In this embodiment, angle ° C. is different than angles θA or B. Additional rows of metasurface elements represented by element 18n can be formed at an alignment angle θn in like fashion. Progressing to the left of metasurface element 18A, a row of metasurface elements represented by element 18D can be formed at an angle θD that can be measured between a line that is parallel to the datum 30 and a longitudinal axis of element 18D. In this embodiment, angle θD is different than angle A. Another row of metasurface elements represented by element 18E can be formed at an angle θE that can be measured between a line that is parallel to the datum 30 and a longitudinal axis of element 18E. In this embodiment, angle θE is different than adjacent angle θD (and the other angles). Additional rows of metasurface elements represented by element 18n' can be formed at an angle θn' in like fashion. The rows can be formed until the metasurface array is complete. The number of rows, angles, shapes, and orientations of the elements and rows can vary depending on the type of control desired and application for the light passing through the metasurface. Further, the longitudinal axis is illustrated as a reference to establish the angle θ to the datum. Other reference lines and surface could be used including a reference line relative to the width or a major or minor axis of an ellipsoid-shaped element, and other convenient reference lines to define angles between the metasurface elements. Further, the angles can vary within a given row, if appropriate for the desired effect in controlling the light.

Figure 3:
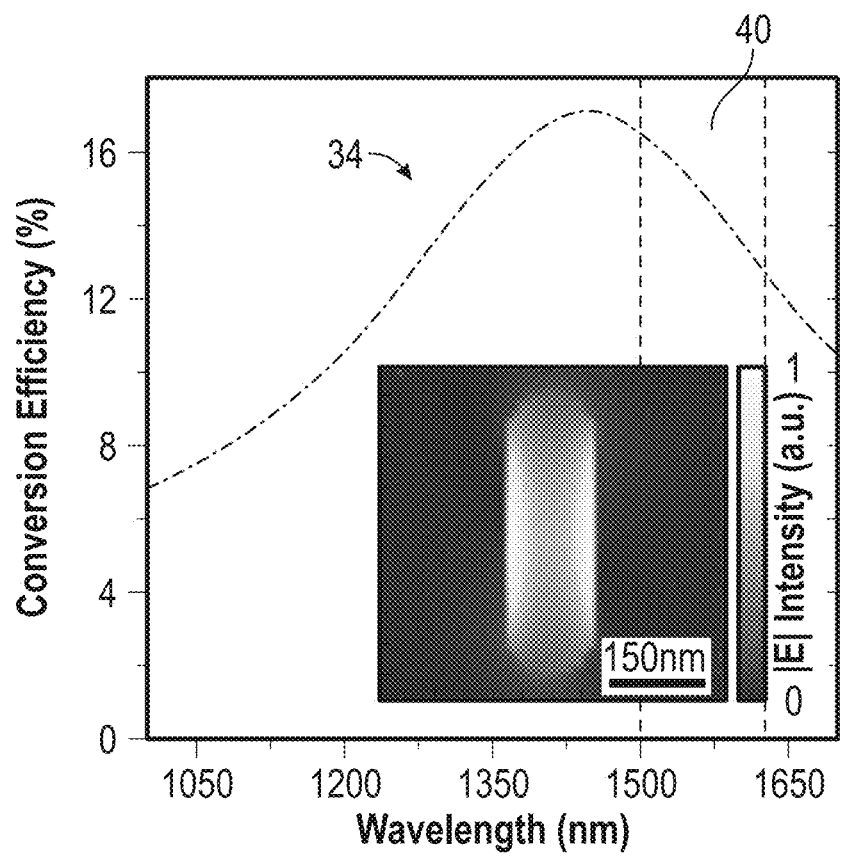
FIG. 3 is a schematic graph of an illustrative right-hand circular polarization (RCP) to left-hand circular polarization (LCP) simulated conversion efficiency of an embodiment of an optimized metasurface element shaped as shown in FIG. 1C.

FIG. 3 is a schematic graph of an illustrative right-hand circular polarization (RCP) to left-hand circular polarization (LCP) simulated conversion efficiency of an illustrative optimized metasurface element shaped as shown in FIG. 1C. The simulated conversion efficiency of this metasurface element has a resonant wavelength calculated as 1482.6 nm with a maximum efficiency of 17%. The graph represents theoretical simulations to determine the required rotational angle of each individual resonant metasurface element with respect to the center to achieve the convergent effect for certain circularly-polarized incident light. The illustrative optimized metasurface element for the given wavelength can have a length/of 500 nm and a width w of 150 nm and depth t of 40 nm with a periodicity p of 600 nm. The dotted line indicates a wavelength region for an experimental bandwidth. In this example, the peak efficiency is about 17% at 1430 nm. In at least one embodiment suited for telecommunication wavelengths, the efficiency is about 16.5% at 1500 nm to about 13% at 1630 nm. The peak at given wavelengths can be optimized for the application given the teachings herein.

Some of the simulations of the large mode area photonic crystal fiber discussed herein were carried out using the MODE Solutions software from Lumerical Solutions, Inc.

For the simulation, the pitch and hole diameters of large mode area photonic crystal fiber (LMA-25) (NKT Photonics, Inc.) were modelled as 16.4 μm and 4 μm, respectively. The example of the material of the photonic crystal fiber used was a pure silica glass. Simulations of the metasurface' intensity distributions were performed using Computer Simulation Technology (CST) Microwave Studio. For the design of unit elements, a unit cell boundary condition is employed for the simulation of transmission spectra in an array configuration. For simplicity, cylindrical lenses are simulated to numerically predicate the focal length of a designed metasurface, where perfect matched layer (PML) and periodic boundary conditions were employed in the X and Y directions, respectively. The permittivity function of silica is modeled with the standard Sellmeier expansion. The complex frequency-dependent dielectric function of gold in the near-IR regime can be described by the Lorentz-Drude model with a damping constant 0.07 eV and a plasma frequency 8.997 eV.

Figure 4:
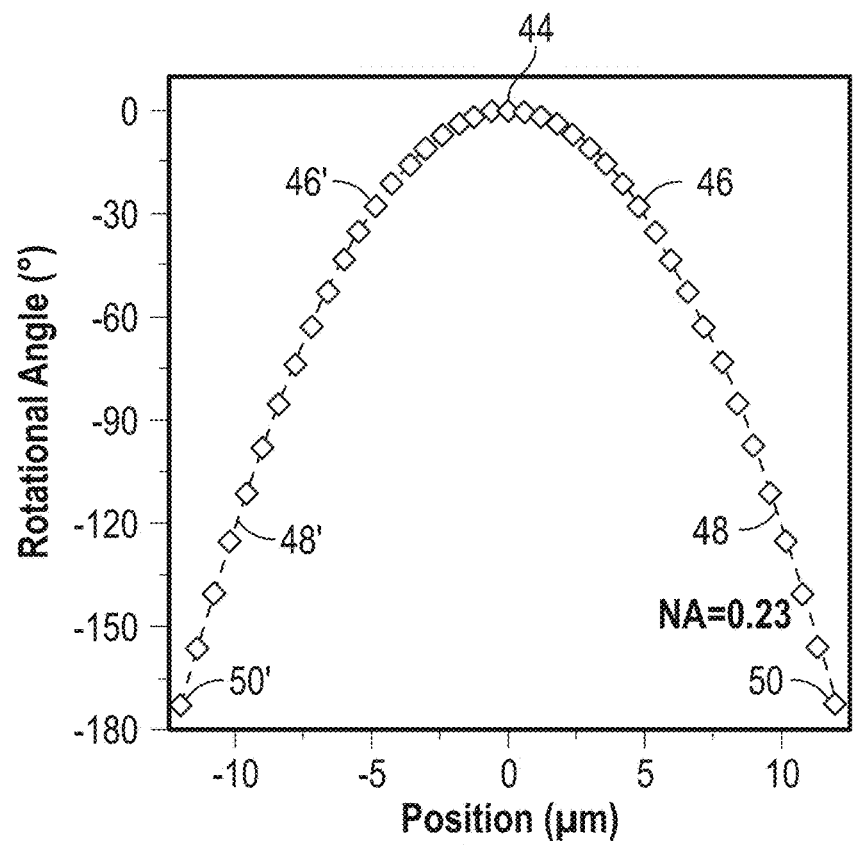
FIG. 4 is a schematic graph of illustrative rotational angles of metasurface elements for a given focal length from the metasurface.

FIG. 4 is a schematic graph of illustrative rotational angles of metasurface elements for a given focal length from the metasurface. The graph illustrates the rotational angles θ of the metasurface elements 18 of the metasurface array 16 in FIG. 1A for a numerical aperture (NA) of 0.37 that is designed to converge light passing through the core 10 into a focused beam of light 12 at focal point 14 for a focal length L of 30 um at a wavelength of 1550 nm. A metasurface element disposed at or proximate to a zero distance (0 μm) at point 44 in the middle of the graph can illustrate a center of the light beam at the focal point 14, such as above the center 28 shown in FIG. 1B. At that point 44, the metasurface element could be at a zero rotational angle θ, which can be expressed as coordinates of ([position], [rotational angle]), that is coordinate (0, 0). As the distance of the metasurface elements moves outwardly from the center point 44, the rotational angle of the metasurface elements can change, such as increase in absolute value in the illustrative embodiment of the FIG. 4 graph. For example, on the left side of the center point 44 at −4.8 μm from the center at point 46', the metasurface element angle θ would be about −28°, or coordinate (−4.8, −28). On the right side of the center point 44 at 4.8 μm from the center at point 46, the element angle θ would be about −28°, or coordinate (4.8, −28). Further, at −10 μm away from the center position at point 48', the angle θ would be about −125°, or coordinate (−10, −125). Similarly, at 10 μm away from the center position at point 48, the angle θ would be about −125°, or coordinate (10, −125). Still further away at −12.5 μm from the center at point 50', the element angle θ would be about −173°, or coordinate (−12.5, −173). Similarly, at 12.5 μm from the center at point 50, the element angle θ would be about −173°, or coordinate (12.5, −173).

Figure 5:
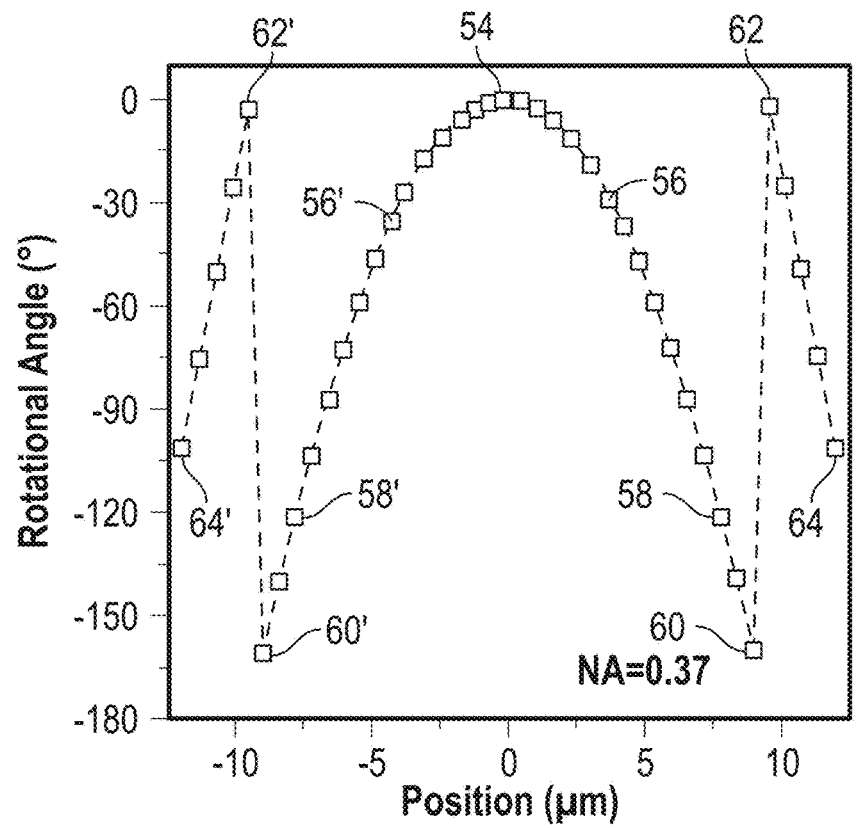
FIG. 5 is a schematic graph of other illustrative rotational angles of metasurface elements for a different focal length from the metasurface than the focal length in FIG. 4.

FIG. 5 is a schematic graph of other illustrative rotational angles of metasurface elements for a different focal length from the metasurface than the focal length in FIG. 4. The graph illustrates the rotational angles θ of the metasurface elements 18 of the metasurface array 16 in FIG. 1A for a NA of 0.23 that is designed to converge light 12 into a focused beam at a focal length L of 50 um at a wavelength of 1550 nm. A metasurface element disposed at or proximate to a zero distance (0 μm) at point 54 in the middle of the graph can illustrate a center of the light beam at a focal point. At that point 54, the metasurface element could be at a zero rotational angle θ, which can be expressed as coordinate (0, 0). As the distance of the metasurface elements moves outwardly from the center point 54, the rotational angle of the metasurface elements can change. For example, on the left side of the center point 54 at −3.6 μm from the center at point 56', the metasurface element angle θ would be about −26.2°, or coordinate (−3.6, −26.2). On the right side of the center point 54 at 3.6 μm from the center at point 56, the element angle θ would be about −26.2°, or coordinate (3.6, −26.2). Further, at −7.8 μm away from the center position at point 58', the angle θ would be about −121°, or coordinate (−7.8, −121). Similarly, at 7.8 μm away from the center position at point 58, the angle θ increases to −121°, or coordinate (7.8, −121). Still further away at −9 μm from the center at point 60', the element angle θ would be about −161°, or coordinate (−9, −161). Similarly, at 9 μm from the center at point 60, the element angle θ would be about −161°, or coordinate (9, −161). At −9.6 μm from the center at point 62', the element angle θ would be about −2.2°, or coordinate (−9.6, −2.2). Similarly, at 9.6 μm from the center at point 62, the element angle θ would be about −2.2°, or coordinate (9.6, −2.2). At −12 μm from the center at point 64', the element angle θ would be about −101°, or coordinate (−12, −101). Similarly, at 12 μm from the center at point 64, the element angle θ would be about −101°, or coordinate (12, −101).

Figure 6:
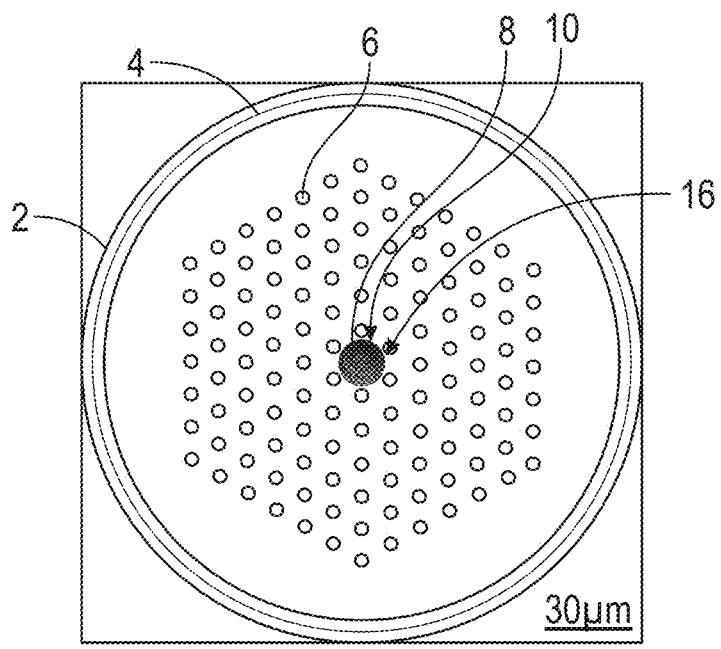
FIG. 6 is a schematic end view of a fabricated illustrative optical fiber with a metasurface formed thereon.
Figure 7:
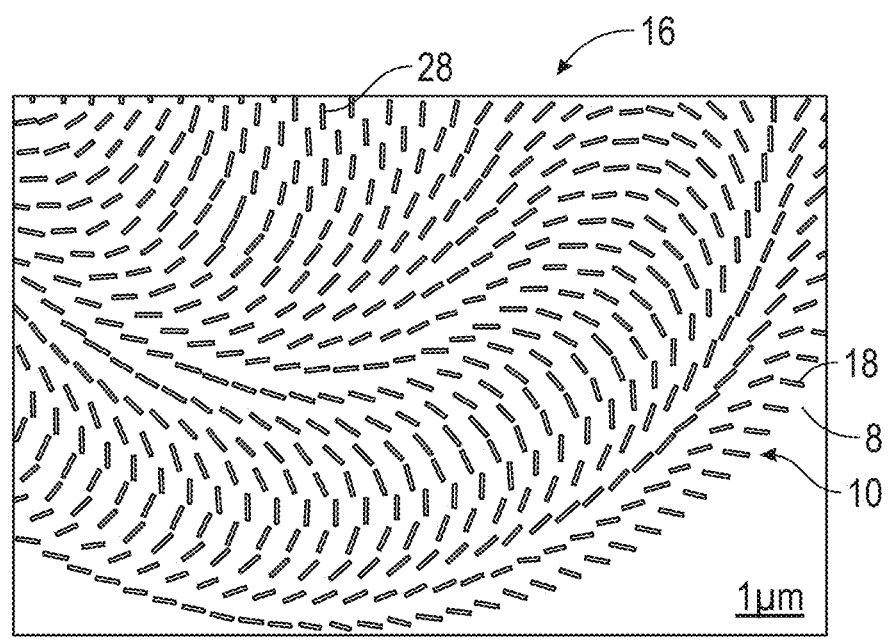
FIG. 7 is a schematic view of an illustrative metasurface array of metasurface elements with a first numerical aperture and a first focal length.
Figure 8:
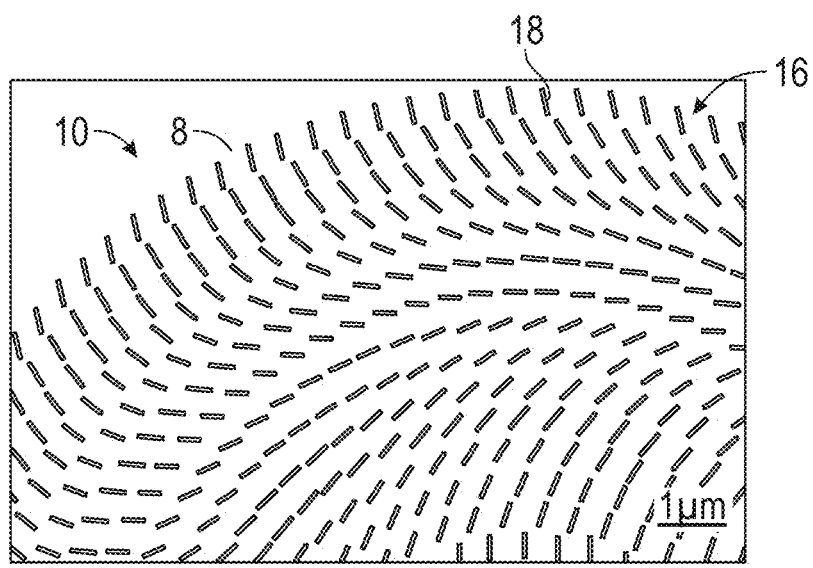
FIG. 8 is a schematic view of another illustrative metasurface array of metasurface elements with a second numerical aperture and a second focal length different than the numerical aperture and focal length of the array in FIG. 7.

FIG. 6 is a schematic end view of a fabricated illustrative optical fiber with a metasurface formed thereon. FIG. 7 is a schematic view of an illustrative metasurface array of metasurface elements with a first numerical aperture and a first focal length. FIG. 8 is a schematic view of another illustrative metasurface array of metasurface elements with a second numerical aperture and a second focal length different than the numerical aperture and focal length of the array in FIG. 7. The facet 4 of the optical fiber to provides a surface to form the metasurface 8 Thereon. The metasurface 8 is formed over the core 10, so that the metasurface array 16 covers the core. The metasurface array 16 includes a plurality of metasurface elements 18 that can be arranged in various positions and angles relative to each other and to a common reference point on the metasurface array, such as a center of the metasurface that in at least one embodiment is aligned with a center of the optical fiber and/or the core. FIG. 7 illustrates at least one embodiment of a metasurface array that is tested at a numerical aperture of 0.37. FIG. 8 illustrates of a metal surface array that is tested at a numerical aperture of 0.23.

Figure 9:
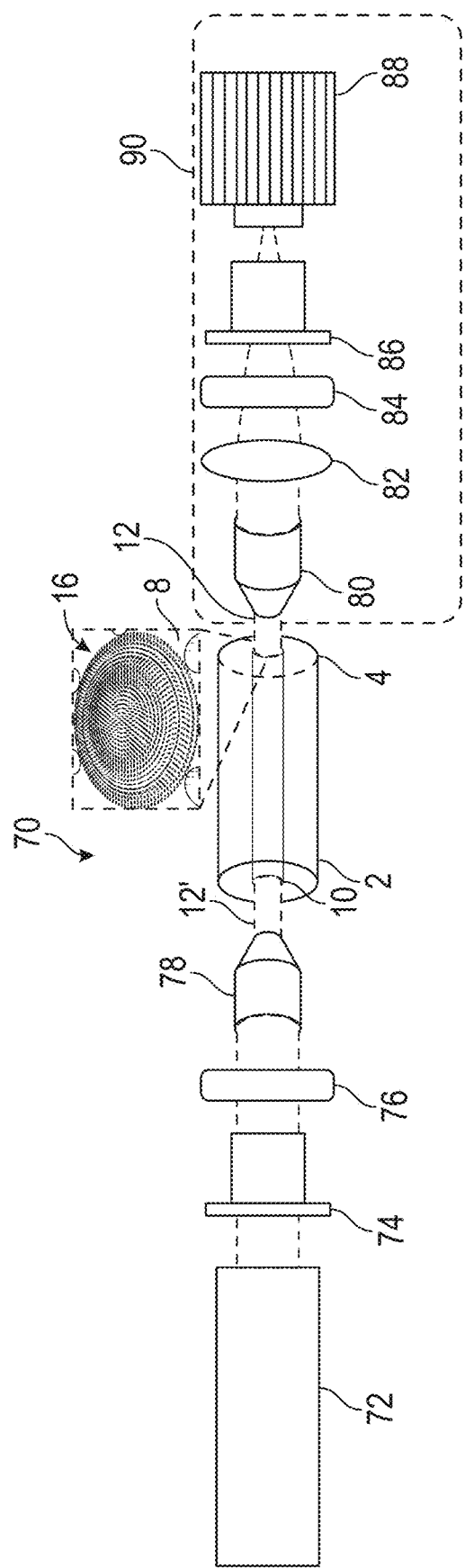
FIG. 9 is a schematic view of an illustrative system for testing the metasurface array results and focal length.

FIG. 9 is a schematic view of an illustrative system for testing the metasurface array results, including focal length and other properties. The system 70 can be used to verify a focusing effect of the metasurface, when so designed. In general, the system can capture light intensity distributions along a propagation direction at distances from the metasurface, such as, a Z-axis scan in an orthogonal coordinate system. In general, the system 70 includes a light source, such as a laser 72 that can direct its light through a linear polarizer 74 and a quarter-wave plate 76 to generate a circularly polarized light. The circularly polarized light can then be focused by an objective lens 78 into the optical fiber 2 as light 12' having a core 10 and an output end facet 4 with the metasurface 8 having a metasurface array 16 formed in the end facet 4, also shown in FIG. 1A. The light 12 passing through the metasurface can be collected by a linear stage 90 through another objective 80, lens 82, quarter wave plate 84, linear polarizer 86 to image the right-hand or left-hand circular polarized output component on a near-infrared camera 88. To obtain the light intensity distribution of the mess surface, the end face of the metasurface is initially focused on the camera (Z=0 nm). Images are then taken while linearly moving away from the end facet in stepped sizes, such as 1-2 µm. Experimentally, it is found that a total moving distance is generally about 50 to 60 µm.

Figure 10:
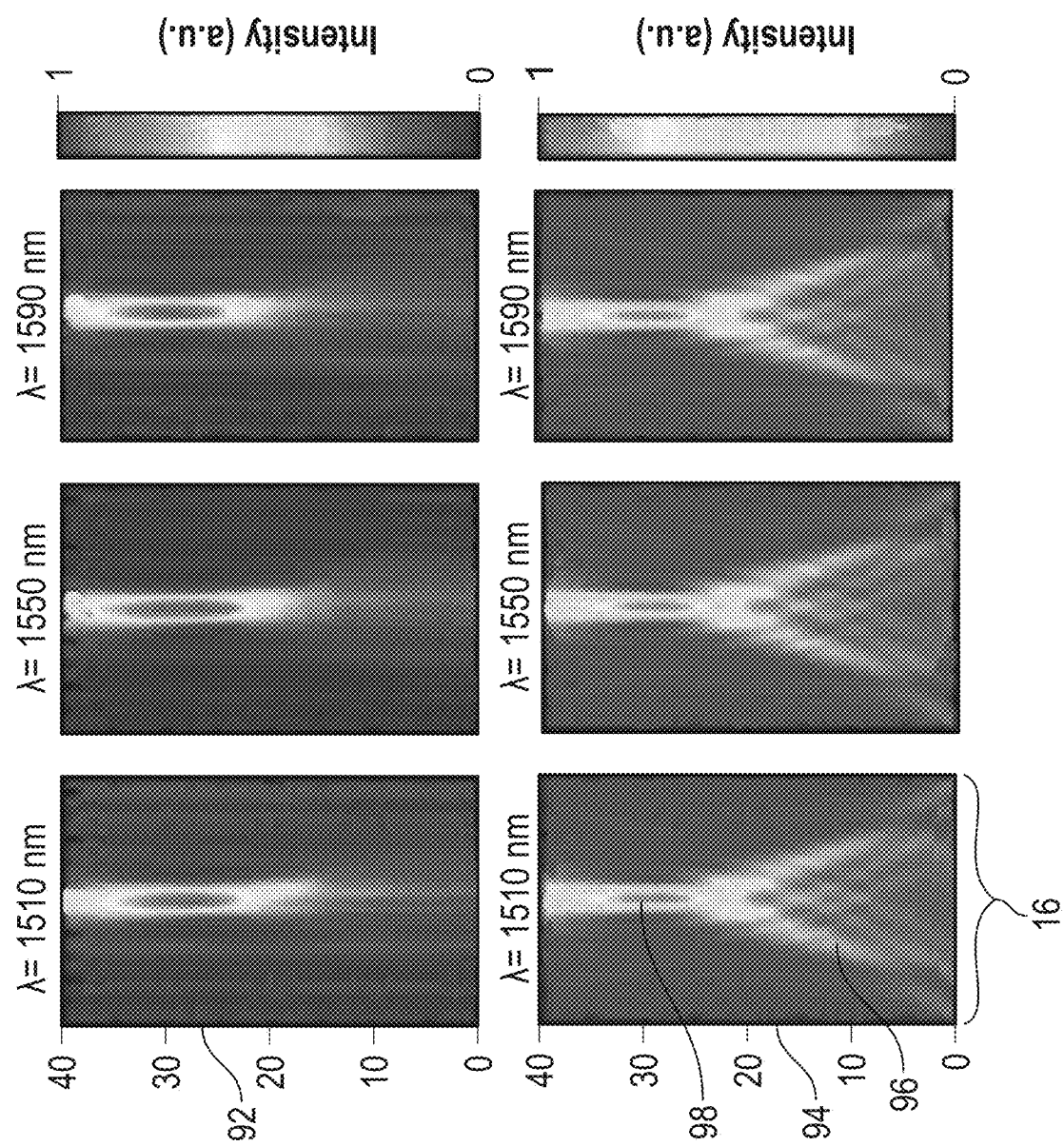
FIG. 10 is a schematic view of experimental test results illustrating light passing through the metasurface that is focused by the metasurface.

FIG. 10 is a schematic view of experimental test results illustrating light passing through the metasurface that is focused by the metasurface. An example is shown of a top row of measured results of a focusing metasurface as described herein to show the intensity in the Y-axis at different example of wavelengths of 1510 µm, 1550 µm, and 1590 µm. The bottom row is simulated intensity distribution profiles of the metasurface. The focusing is shown in the simulated rows more clearly from an initial distributed light across the metasurface array 16 to converging light 96 to a focused light 98 of high intensity at a focal length that ultimately closely corresponds to the actual measured intensity of the focused light 92 in the top row for each of the sample wavelengths.

Figure 11:
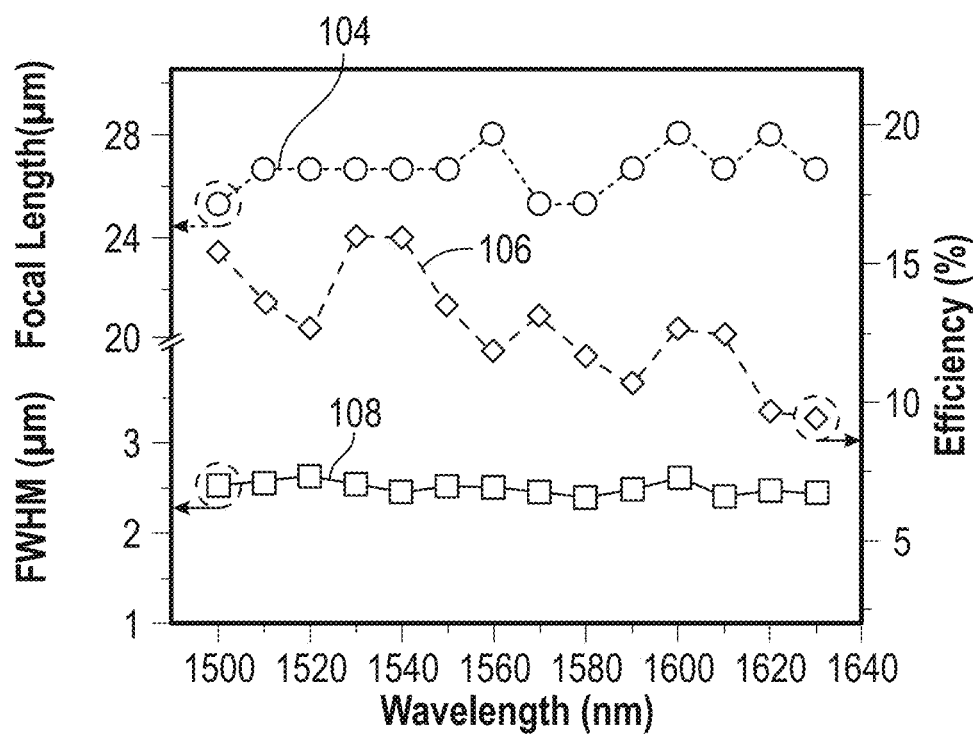
FIG. 11 is a schematic chart of experimental measurements of multiple light properties versus a wavelength when focused with an illustrative metasurface.

FIG. 11 is a schematic chart of experimental measurements of multiple light properties versus a wavelength when focused with an illustrative metasurface. Line 104 represents the measured results of focal length at different wavelengths using the Y-axis on the left side of the graph. In the nonlimiting example, the focal length varies from about 25-28 µm from about 1500-1630 µm wavelengths, with the majority of the focal lengths between 27-28 µm. Line 106 represents an operational efficiency on a corresponding focal plane at different wavelengths using the Y-axis on the right side of the graph. The efficiency trends toward a decrease with increasing wavelength value with a high slightly more than 16% at about 1520-1530 µm wavelength to a low slightly more than 9% at 1630 µm wavelength. Line 108 represents the full-width at half-maximum, representing the focused spot size that shows a relative constant value of about 2.6 µm from 1500-1630 µm wavelength.

Figure 12:
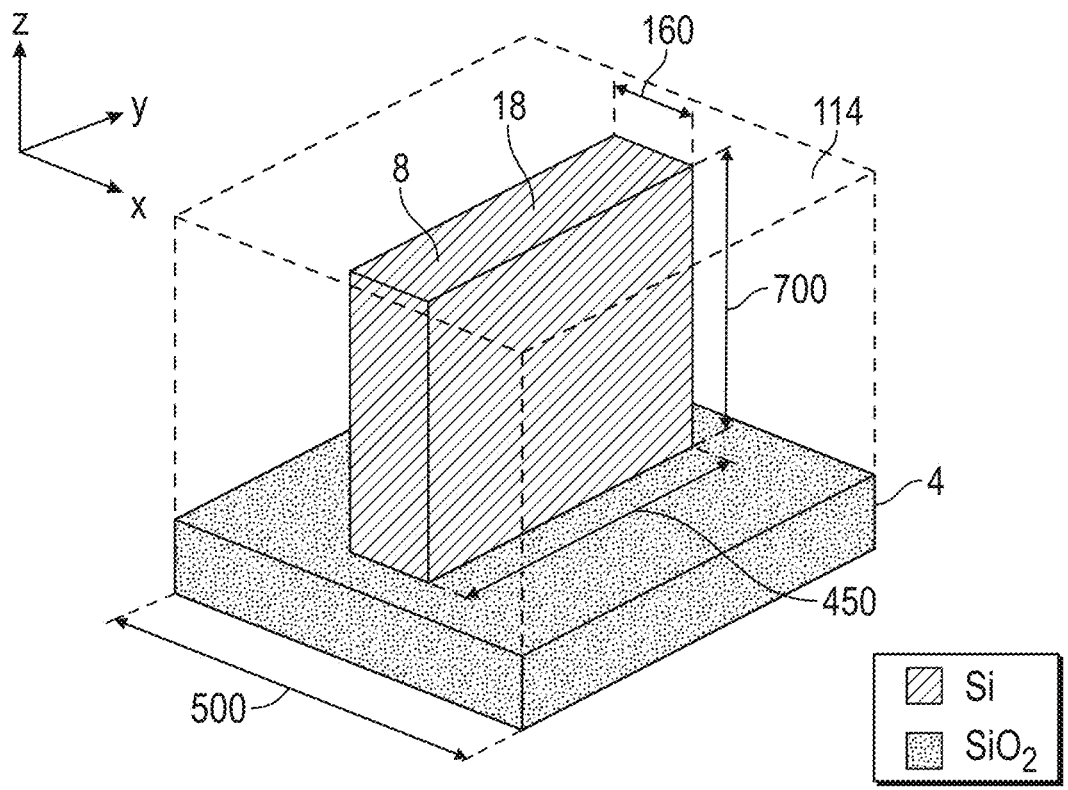
FIG. 12 is a schematic perspective view of another embodiment of a metasurface element.

FIG. 12 is a schematic perspective view of another embodiment of a metasurface facet 4. A layer of a conductive dielectric silicon can be formed on the facet 4 of the optical fiber. A metasurface element 18 can be formed by removing material 114 around the element so that the remaining material of a metasurface 8 becomes the metasurface element that protrudes from the facet of the optical fiber. Other embodiments can include the silicon layer deposited on the silica and formed upwardly from the silica surface, rather than etching material away downwardly.

Figure 13:
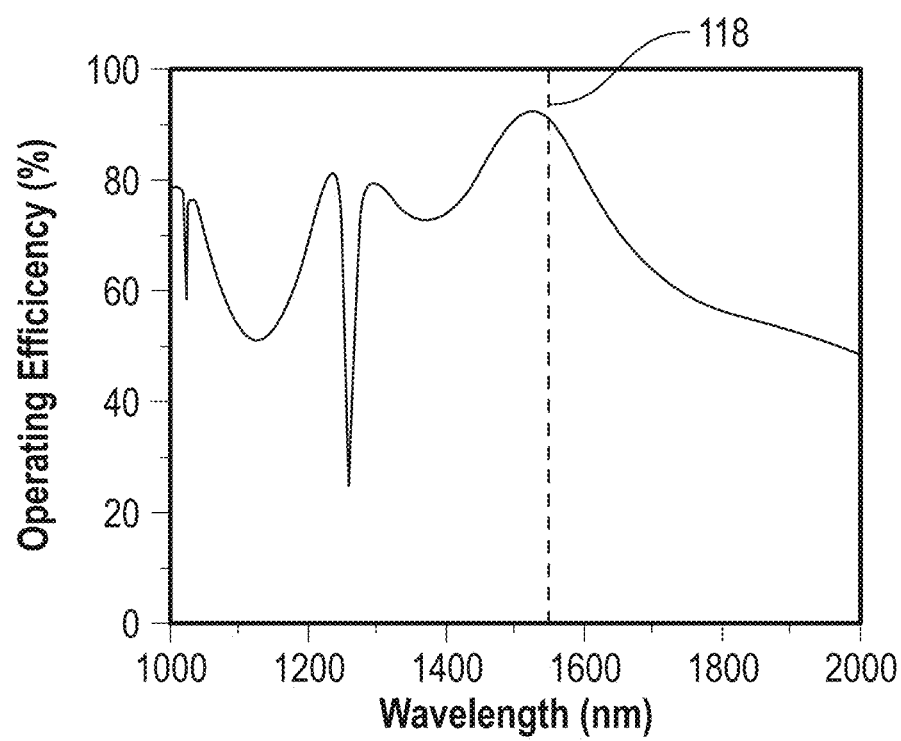
FIG. 13 is a schematic graph of a right-hand circular polarization to left-hand circular polarization efficiency versus wavelength of the metasurface element in FIG. 12.

FIG. 13 is a schematic graph of a right-hand circular polarization to left-hand circular polarization efficiency versus wavelength of the metasurface element in FIG. 12. The polarization efficiency of an RCP-LCP conversion efficient of the simulated structure and of the metasurface 8 having the protruding metasurface element 18 is about 91% at a wavelength of about 1550 nm.

Figure 14:
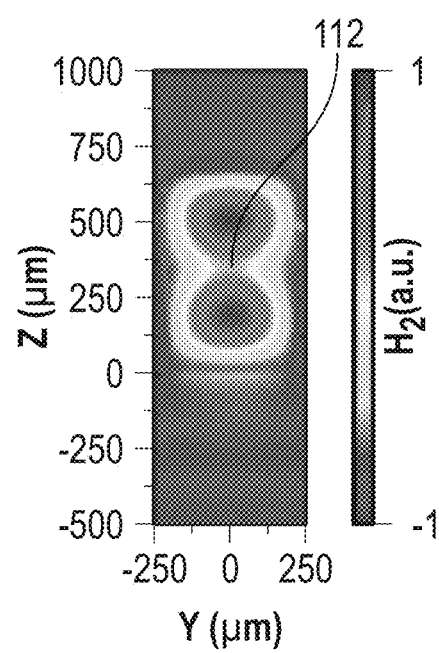
FIG. 14 is a schematic graph of an illustrative magnetic field distribution of a metasurface element at a given wavelength.

FIG. 14 is a schematic graph of an illustrative magnetic field distribution of a metasurface element at a given wavelength. The magnetic field distribution of the dielectric metasurface element, shown in FIG. 12, illustrates a magnetic field 112 at resonance, where the inner rings are significantly energized toward the middle of the metasurface element.

Figure 15A:
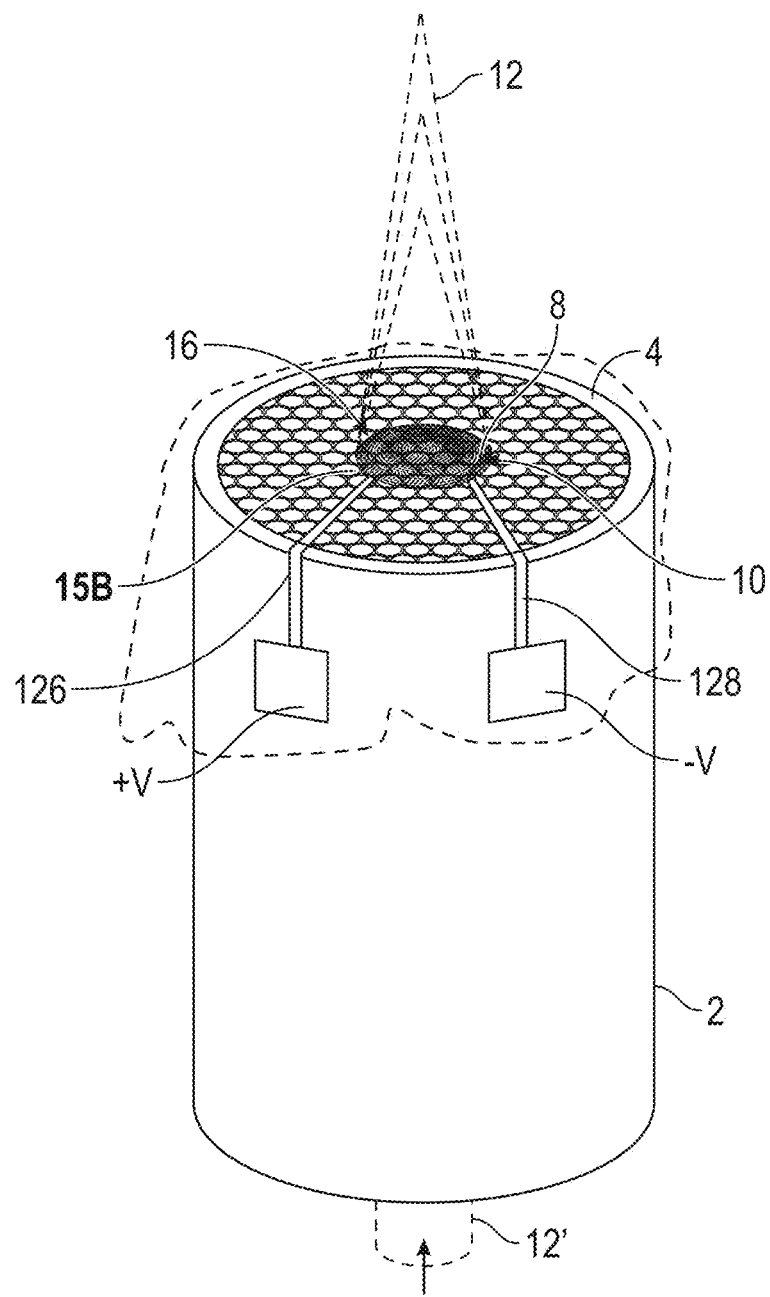
FIG. 15A is a schematic perspective view of an illustrative tunable metasurface on an optical fiber.
Figure 15B:
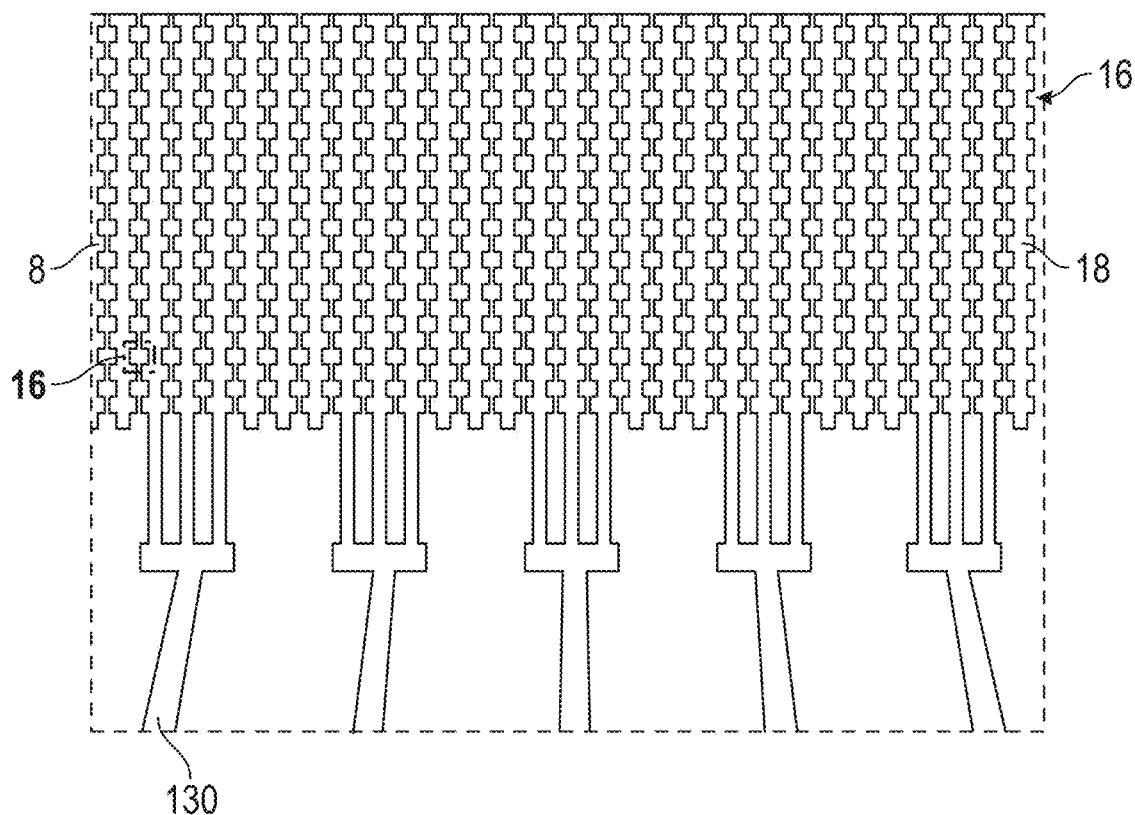
FIG. 15B is a schematic top view of an enlargement of a portion of the metasurface in FIG. 15A showing an illustrative metasurface pattern of tunable metasurface elements.

FIG. 15A is a schematic perspective view of an illustrative tunable metasurface on an optical fiber. FIG. 15B is a schematic top view of an enlargement of a portion of the metasurface in FIG. 15A showing an illustrative metasurface pattern of tunable metasurface elements. This illustrative embodiment provides a tunable (such as a gate-tunable) metasurface on a PCF type of optical fiber. In at least one embodiment, the tunable metasurface is responsive to the voltage and changes in performance to provide an active control of the focusing characteristic (and other characteristics described herein) of the metasurface on the optical fiber. The optical fiber 2 with a core 10 can include a metasurface 8 deposited on the facet 4 of the fiber. The metasurface 8 includes a metasurface array 16 of metasurface elements 18. The metasurface elements 18 in this embodiment are tunable by applying voltages from a first conductor 126 with a corresponding voltage drain on a second conductor 128. One or more of the conductors can be coupled to element conductors, such as element conductor 130.

Changing the performance of the metasurface can change characteristics of the light, such as the phase and thus the focal length, direction of a light beam, and other properties. The tunable embodiment can use, for example and without limitation, metallic materials, conducting oxides, insulators, metal nitrides, and others, for the metasurface and can resemble a MOS-type structure. Such an embodiment allows control of the optical confinement based on the accumulated electron distribution and tunable frequency for a controllable phase, and thus affects the focal length and other characteristics.

TCOs are heavily doped semiconductors with high transmittance at visible and near-infrared frequencies, with typical carrier concentrations between $10^{19}$-$10^{21}$ $cm^{-3}$. TCOs exhibit metallic characteristics (e.g., negative permittivity) in the visible or near-infrared regime depending on the carrier concentration of the materials. While the conducting oxides exhibit metallic properties, their material loss is significantly lower than noble metals such as gold and silver, giving them significant potential as alternative plasmonic/metasurface materials. The carrier concentration of TCO can be varied by different fabrication methods, post-processing techniques (such as by annealing), and altering the oxygen flow rate during depositions. For example, the ellipsometry-measured permittivity of an Indium Tin Oxide (ITO) film can be fabricated with a sputtering machine with different sputtering temperatures. Materials with different epsilon-near-zero frequencies ($-1<\varepsilon r<1$) and low material loss ($\varepsilon i<0.5$) can be used. Another fabrication technique, atomic layer deposition (ALD), can for example fabricated AZO with a thin film (thickness <20 nm) with an ENZ wavelength of 1500 nm-1700 nm can be fabricated by varying the dopant ratio, allowing precise control of the thin film properties.

Titanium nitride (TiN) belongs to the family of refractory transition metal nitrides (TMNs) and exhibits characteristics of both covalent compounds (ceramics), such as high melting points (~3000° C.), oxidation resistance, thermodynamic stability, and extreme hardness, and characteristics of metals, such as good thermal and electrical conductivity. TiN has been extensively used in metallization schemes for silicon ultra-large-scale integrated circuits and as the material for diffusion barriers, rectifying and ohmic contacts, and gate electrodes in field-effect transistors. TiN can exhibit metallic properties (e.g., negative permittivity) in the visible/NIR frequencies due to its high carrier concentration. TiN thin film can be fabricated, for example, as a metasurface by using the molecule-beam epitaxy (MBE) and atomic layer deposition (ALD) techniques. The high-quality thin film can be fabricated with thicknesses from sub-nanometer to a few hundred nanometers with carrier concentration of ~$9.2\times10^{20}$ $cm^{-3}$ and corresponding ENZ wavelength of ~450 nm. In addition, ultrathin TiN films can be fabricated with the ALD technique, for example, with a thickness of 13 nm and 32 nm. TiN films can vary with ENZ at ~750 nm and 1200 nm by varying the deposition temperature. While TiN films exhibit comparable metallic and optical properties as gold in the same spectral region, they are economically more viable and their material properties are more suitable for both harsh environments and CMOS processes, giving them significant potential as alternative plasmonic materials.

Figure 16:
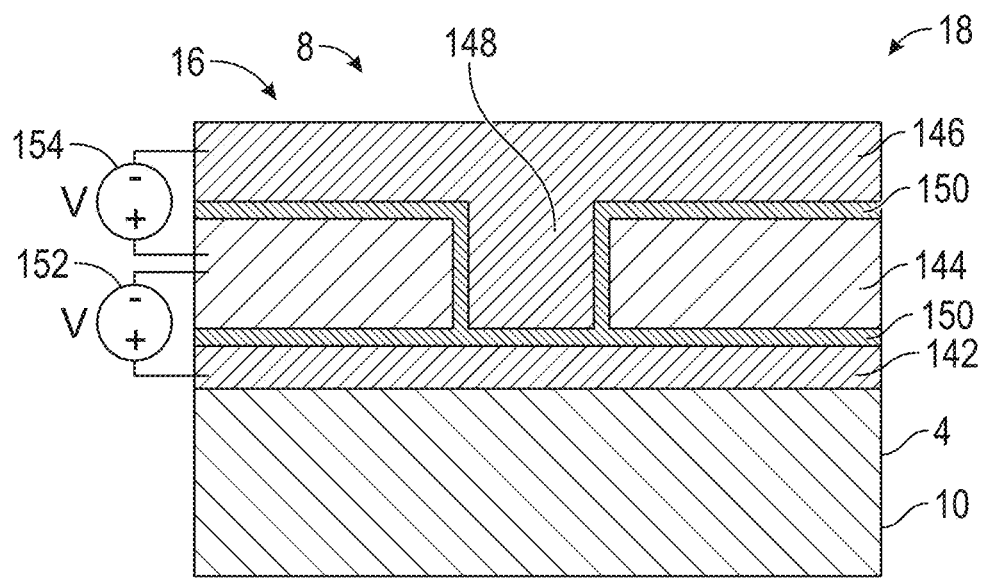
FIG. 16 is a schematic cross-sectional view of an illustrative tunable metasurface element.

FIG. 16 is a schematic cross-sectional view of an illustrative tunable metasurface element. In the illustrated embodiment, a first layer of a conducting oxide 142 can be deposited on the optical fiber core 10. In some embodiments, conducting oxide layers can be of a TCO material. An insulating layer 150, such as aluminum oxide can be deposited on the conducting oxide layer. A metal or other metallic layer 150 can be deposited on the insulation layer. The metallic layer 150 can be etched or otherwise formed as needed. In this case, a light aperture 148 is formed between portions of the metallic layer 144. A further insulating layer 150 can be deposited over the metallic layer. Another conducting oxide layer 146 can be deposited over the insulating layer. One or more voltage sources can be coupled to the layers. For example, a first voltage source 152 can be coupled between the conducting oxide layer 142 and the metallic layer 144. Similarly, a second voltage source 154 can be coupled to the metallic layer 144 and the conducting oxide layer 146. The multiple voltage sources for each structure can be changed by individual voltages for more tunability options.

Figure 17:
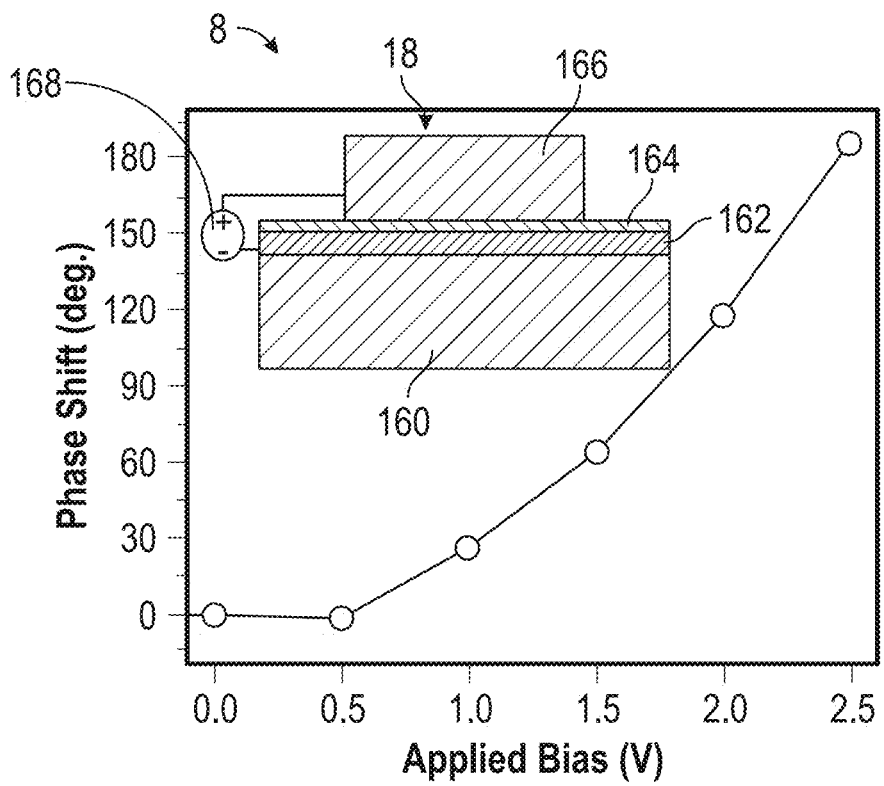
FIG. 17 is a schematic chart of measured phase shift versus applied bias of an alternative tunable metasurface element illustrated in an inset of the chart.

FIG. 17 is a schematic chart of measured phase shift versus applied bias of an alternative tunable metasurface element illustrated in an inset of the chart. This chart is based on a variation of the above referenced tunable metasurface element. The metasurface 8 includes a metallic reflective layer 160, such as gold, that can be deposited on the silica of the optical fiber core (not illustrated). A conducting oxide 162, such as ITO, can be deposited on the reflective layer. An insulating layer 164, such as aluminum oxide, can be deposited on the conducting oxide layer. Another metallic layer 166, such as gold, can be deposited on the insulating layer. The layer 166 can be patterned with metasurface elements to form a metasurface array described herein. A voltage source 168 is coupled between the conducting oxide layer 162 and the metallic layer 166.

The graph in this figure illustrates the effect of applied voltage to the constructed tunable metasurface element. At 0 V, there is no phase shift and the metasurface element operating in a default mode. As voltage is applied to the tunable metasurface element, the phase of the light shifts by 180° (π) when 2.5 V are applied to this element as a given wavelength.

Figure 18:
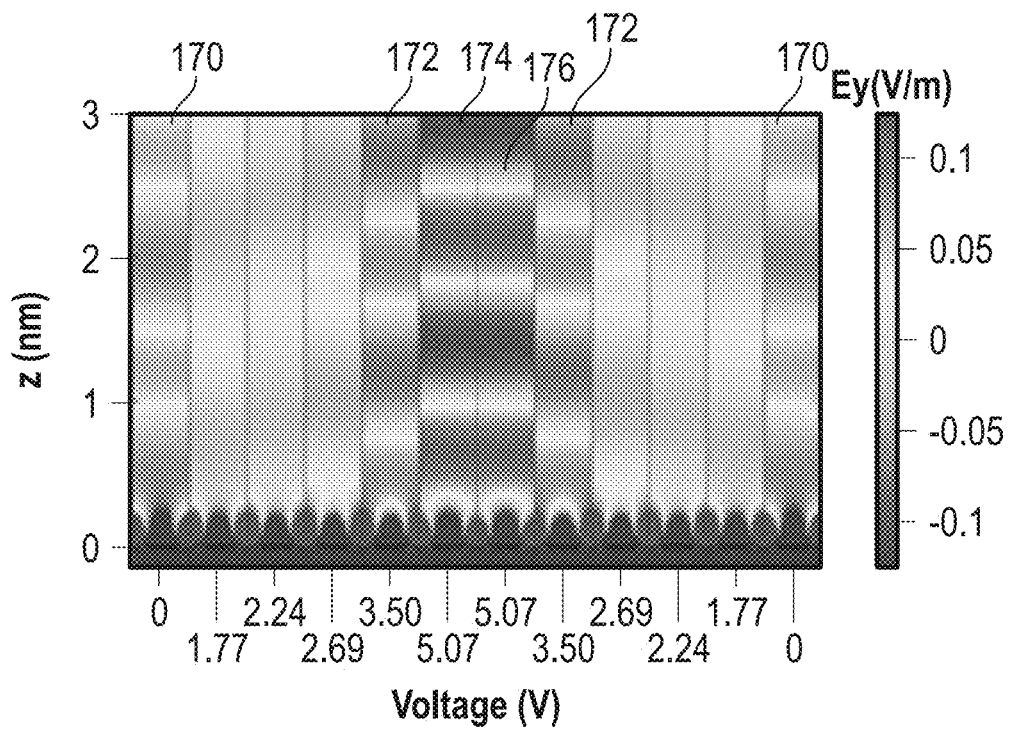
FIG. 18 is a schematic graph of a simulated phase front showing the control of phase and focusing effects with applied voltages.

FIG. 18 is a schematic graph of a simulated phase front showing the control of phase and focusing effects with applied voltages. FIG. 18 shows a simulation of the phase properties of a reflected array metasurface, where the metasurface elements are gated with different voltages. These results predict that the phase front of the light can be shaped via applied voltages, and thus a metasurface lens with tunable focus could be realized. In this example, a sample voltage of 5.07 V is applied to points 176 and 174. Voltages 3.5 V, 2.69 V, 2.24 V, 1.77 V, and 0 V are applied from point 172 to point 170, respectively. The phase front graph illustrates no phase shift at 0 V at points 172 on the ends of the graph. At maximum voltage of 5.07 V, the phase shift is significant at point 174.

Figure 19A:
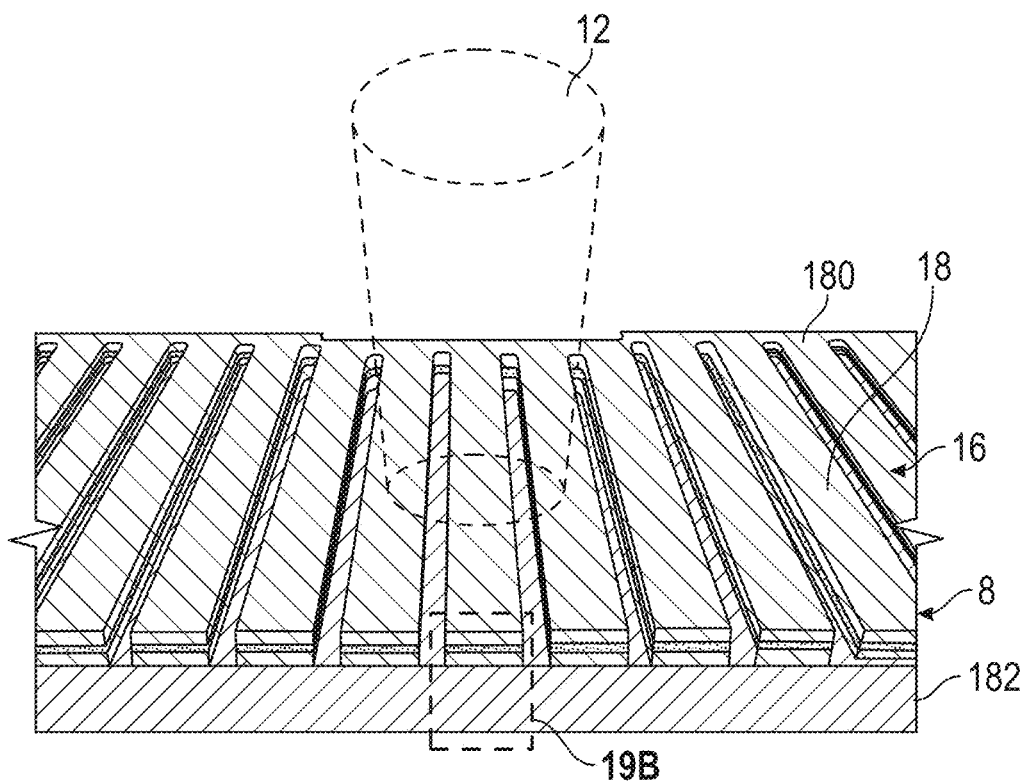
FIG. 19A is a schematic perspective view of another embodiment of a tunable metasurface on an optical fiber.
Figure 19B:
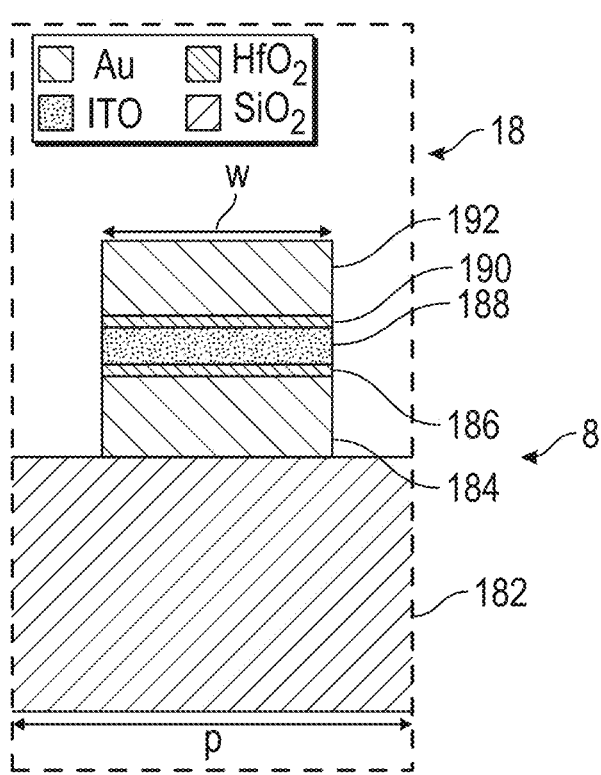
FIG. 19B is a schematic cross-sectional view of an illustrative tunable metasurface element of the metasurface in FIG. 19A.

FIG. 19A is a schematic perspective view of another embodiment of a tunable metasurface on an optical fiber. FIG. 19B is a schematic cross-sectional view of an illustrative tunable metasurface element of the metasurface in FIG. 19A. This embodiment shows another gate tunable metasurface array. For simulation purposes, the metasurface 8 can be formed on a layer 182 of silica such as 1 μm thick. In practical applications, the silica could be the material of the optical fiber at the facet. The metasurface array 16 can be formed of laterally spaced elongated metasurface elements 18 that can be joined at one end 180 metasurface array for a uniform voltage across the elements. The light 12 can pass through the metasurface array. The metasurface element 18 in this embodiment can include a first layer 182 of silica. A metallic layer 184, such as gold, can be deposited on the layer 182. An insulator layer 186, such as hafnium dioxide. A dielectric layer 188, such as ITO, can be deposited on the insulator layer 186. Another insulator layer 190 can be deposited on the dielectric layer 188. Another metallic layer 192 can to be deposited on the insulator layer 190.

Figure 20:
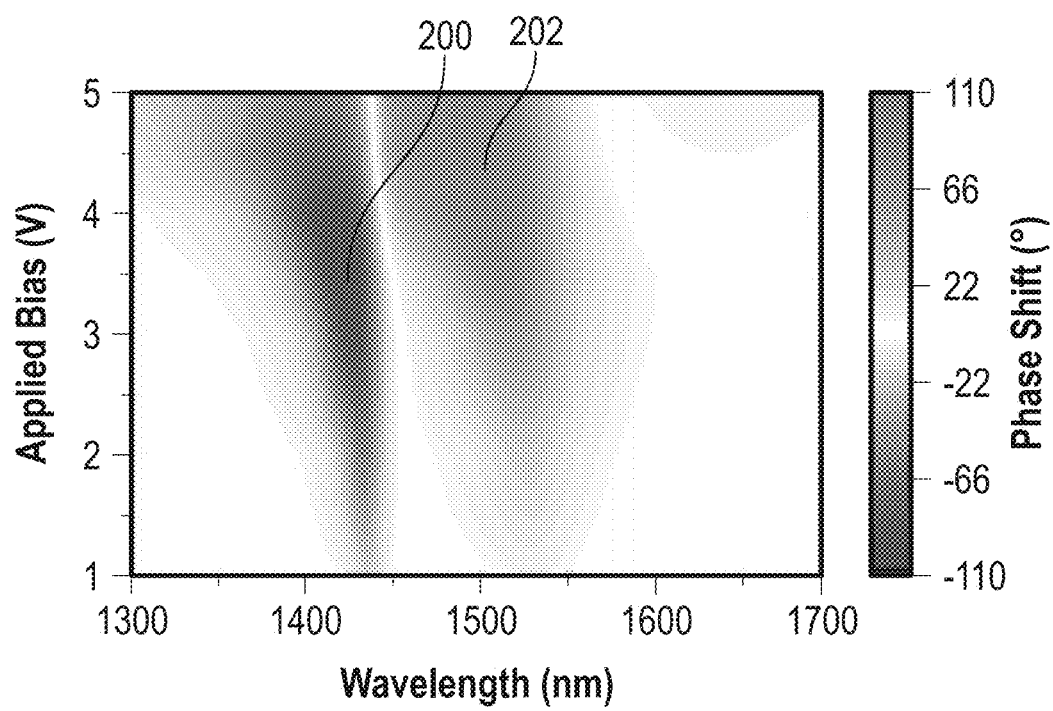
FIG. 20 is a schematic graph showing simulated phase shift resulting from applied bias voltage at various wavelengths.

FIG. 20 is a schematic graph showing simulated phase shift resulting from applied bias voltage in a wavelength range from 1300 nm to 1700 nm. By applying voltage to the tunable metasurface array illustrated in FIGS. 19A and 19B, the phase of metasurface element can be largely shifted from −110° to 110°. These results predict that the phase front of the light can be shaped via applied voltages, and thus a metasurface lens with a tunable focus would be realized.

Figure 21:
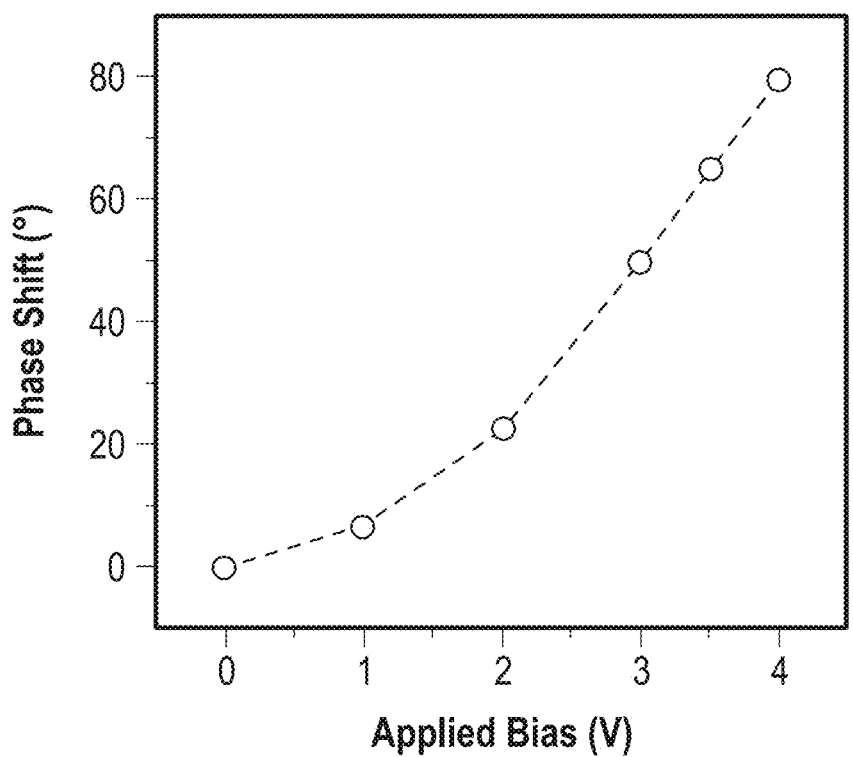
FIG. 21 is a schematic graph showing the simulated phase shift resulting from applied bias voltage at a given wavelength.

FIG. 21 is a schematic graph showing the simulated phase shift resulting from applied bias voltage at a given wavelength. By applying various voltages to the tunable metasurface array illustrated in FIGS. 19A and 19B, the phase shift can be viewed for a given wavelength. In this example, the phase shift is 80° at 4 V for a wavelength of 1550 nm.

Figure 22:
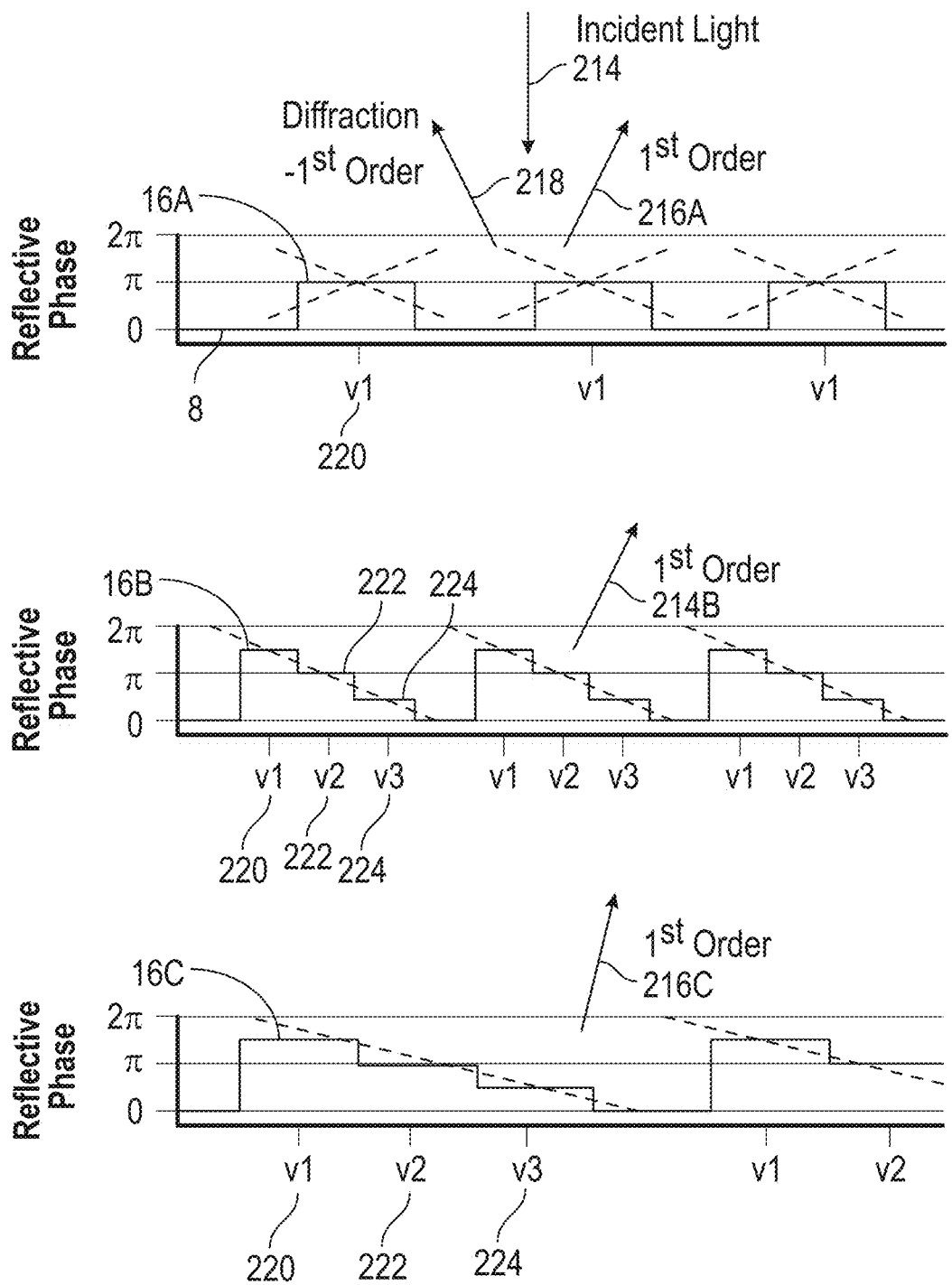
FIG. 22 is a schematic graph of three variations in light beam steering for various applied voltages.
Figure 23:
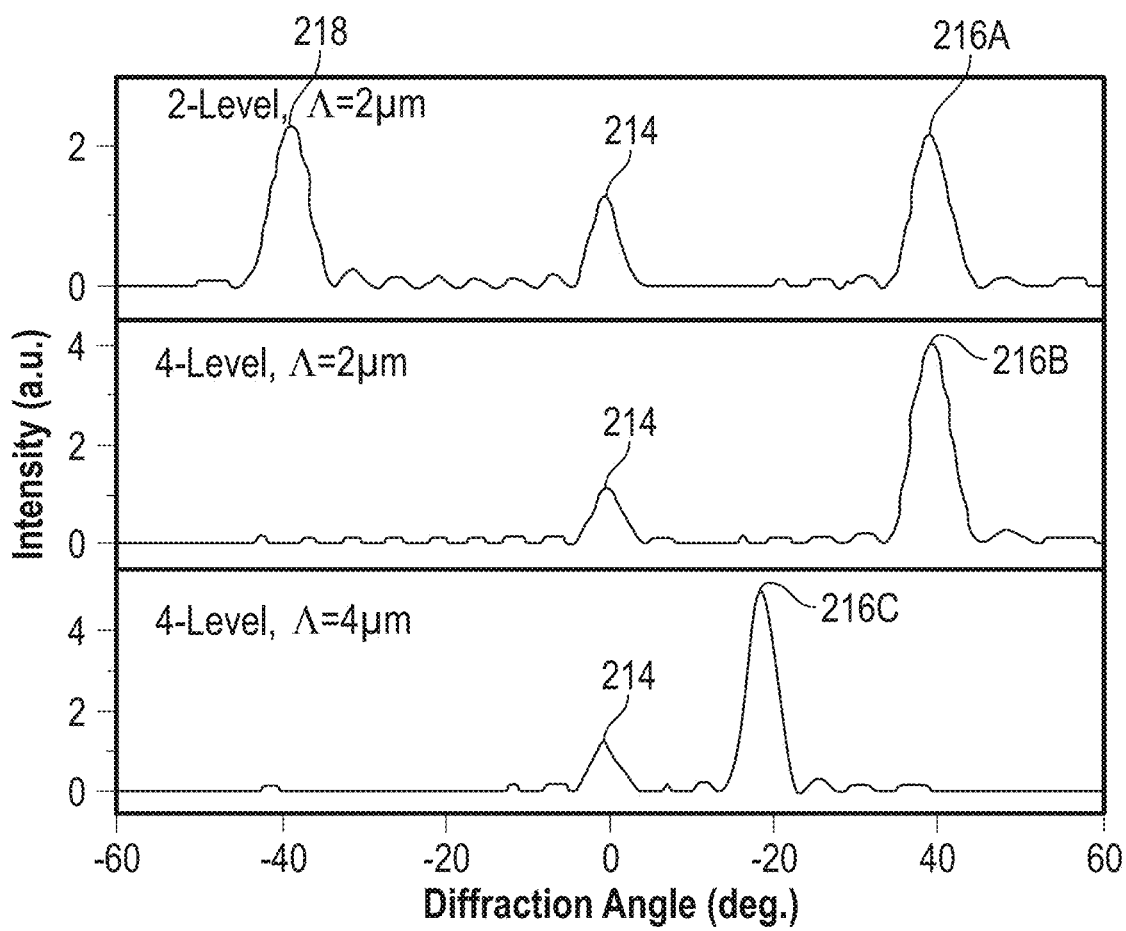
FIG. 23 is a schematic graph of three light intensities at various diffraction angles for three light beam steering variations in FIG. 22.

FIG. 22 is a schematic graph of three variations in light beam steering for various applied voltages. FIG. 23 is a schematic graph of three light intensities at various diffraction angles for three light beam steering variations in FIG. 22. High energy beams of light 214 exiting from an optical fiber can benefit from steering the beam in a variety of angles by diffraction from a tunable metasurface array of metasurface elements, such as illustrated in FIG. 16. External alignment systems, such as a mechanically steering mirror and lens, can change angle and directions of the beam. However, such alignment systems can be slow, complicated, and bulky. The present invention provides for electronically steering the beam. The tunable metasurface can steer the beam or change the focus of the beam at ultrafast speeds (such as greater than 10 GHz or higher), and a power efficient manner (such as less than 50 fJ per bit). As discussed above, the structures can be fabricated formed directly on the end facet of the optical fiber. The tunable materials, such as TiN, can withstand high intensity light without damage due to their properties as refractory metal. For example, applications could include surgical lasers and other uses of lasers with high intensity light.

In the top variation illustrated in FIG. 22 (resembling the metasurface element structure illustrated in FIG. 16), the example of a tunable metasurface array 16A can be energized by applying voltage v1 at incremental spatial locations in the array to cause a phase change, such as a phase change of π, in characteristics of reflection with diffraction order of ±1. As the incident light 214 reaches the metasurface array 16A energized into a phase changed state, the light can be reflected as a diffracted light 216A and diffracted light 218 at different angles than the incident light 214. The results are shown in the top graph in FIG. 23. For this example, the incident light 214 is at 0°, the diffracted light 216A is angled at about 40° to the right of the incident light, and the diffracted light 218 is angled at about −40° to the left of the incident light of diffraction.

In the middle variation illustrated in FIG. 22, the example of a tunable metasurface array 16B can be energized by applying a plurality of voltages, v1, v2, v3, at incremental spatial locations 220, 222, 224 to form a set 226 in the array to cause incremental phase change at the applied locations in the set. The application of the voltages can be repeated at a plurality of sets. As the incident light 214 reaches the metasurface array 16A energized into a phase changed state, the light can be reflected at an angle as a diffracted light 216B at a different angle than the incident light 214. The results are shown in the middle graph in FIG. 23. For this example, the incident light 214 is at 0°, the diffracted light 216B is angled at about 40° to the right of the incident light. Further variations are different voltages for different sets, different voltages within the set that do not form the illustrated stepped shape in phase change, such as curved or other phase shaping.

In the lower variation illustrated in FIG. 22, the example of a tunable metasurface array 16C can be energized by applying a plurality of voltages, v1, v2, v3, at incremental spatial locations 220, 222, 224 to form a set 226 in the array to cause incremental phase change at the applied locations in the set. However, in this variation, the voltages are applied at increased lengths, resulting in a less inclined shape of the phase change than the shape in the middle variation. The application of the voltages can be repeated at a plurality of sets. As the incident light 214 reaches the metasurface array 16C energized into a phase changed state, the light can be reflected at an angle as a diffracted light 216C at a different angle than the incident light 214. The results are shown in the middle graph in FIG. 23. For this example, the incident light 214 is at 0°, and the diffracted light 216C is angled at about 20° to the right of the incident light.

Some of the simulations of the large mode area photonic crystal fiber discussed herein were carried out using the MODE Solutions software from Lumerical Solutions, Inc. The pitch and hole diameters of large mode area photonic crystal fiber (LMA-25) (NKT Photonics, Inc.) are 16.4 µm and 4 µm, respectively. The example of the material of the photonic crystal fiber used was a pure silica glass. Simulations of the metasurface' intensity distributions were performed using Computer Simulation Technology (CST) Microwave Studio. For the design of unit elements, a unit cell boundary condition is employed for the simulation of transmission spectra in an array configuration. For simplicity, cylindrical lenses are simulated to numerically-predicate the focal length of designed metasurfaces, where perfect matched layer (PML) and periodic boundary conditions were employed in the X and Y directions, respectively. The permittivity function of silica is modeled with the standard Sellmeier expansion. The complex frequency-dependent dielectric function of gold in the near-IR regime can be described by the Lorentz-Drude model with a damping constant 0.07 eV and a plasma frequency 8.997 eV.

Illustrative and Non-Limiting Experiment

A metasurface was developed by directly patterning a geometric phase, such as a Beery phase, based metasurface with a thickness of 40 nm onto the end facet of a large mode area photonic crystal fiber (LMA-PCF) made of pure silica with a large core diameter of 25±1 um. The circularly-polarized incident beam can be focused after passing from the fiber in the telecommunication wavelength regime with considerable focusing efficiency To experimentally form the PCF metasurface, a gold layer with a thickness of 40 nm was deposited on the end facet of the LMA-PCF by magneton sputtering. The metasurface array pattern was fabricated by focused ion beam milling (FIB) (although other nano-fabrication techniques could have been used including for example electron beam lithography) with acceleration voltage of 30 kV and current of 100 pA. Special care was taken to align the center of the fiber such that the metasurface array covered completely to the core of the fiber. The scanning electron microscope (SEM) images of the fabricated metasurface on the facet of PCF are depicted in FIG. 6 and an enlarged version with NA=0.37 in FIG. 7, and an enlarged version with NA=0.23 in FIG. 8. The simulated transmissions of the fabricated samples using the dimensions obtained in SEM show that the resonant wavelengths are located at 1499.3 and 1490.3 nm with maximum efficiencies of 17% and 16.5% for metasurface with NA of 0.37 and 0.23, which are close to the designed structure.

To verify the focusing effect of the in-fiber metasurface, the light intensity distributions were captured by imaging the field intensity along the light propagation direction with a Z-scan setup that includes the system illustrated in FIG. 9. Using the designed geometric phase based metasurfaces, the incident right-hand circular polarized (RCP) light was launched into the PCF metasurface, and the left-hand circular polarization (LCP) component was collected as output light. The stitching field intensity profiles on the X-Z plane for metasurface at wavelengths ranging from 1510 to 1610 nm with a step of 20 nm are shown in FIG. 10. It can be seen that the light density increases as the distance increases from the end facet of the PCF metasurface to the focal plane, thus demonstrating the focusing effect. The observed focal length locates at ~30 µm. The measured light distributions show good agreement with the simulated results by using the actual size of metasurface element obtained from SEM images. To confirm the focusing effect from the metasurface, the RCP components from the output were collected in the same way as LCP components, and no focusing was observed from RCP output component, which is consistent with the theoretical design of the Berry phase based metasurface.

The optical performance of metasurfaces was also analyzed. FIG. 11 shows the analysis of the dependence of focal lengths on the wavelength. For the PCF metasurface with NA of 0.37, the measured focal lengths varied from 26.7 to 28.0 µm between wavelengths of 1500-1630 nm, which are in good agreement with the simulated results (i.e., focal length of 28.5 µm within the same wavelength range). Although not illustrated, for the metasurface with NA of 0.23, the experimental focal lengths are varied from 40.0 to 41.3 µm between operation wavelengths of 1500-1630 nm, closely resembling the simulated results of 40.0 to 41.0 µm. However, this focal length shows larger offset from the theoretical calculation, which is mainly from the implemented phase distribution only divided in the first Fresnel zone. This can be effectively addressed by either increasing the core size or the NA of metasurface. The measured and simulated focal lengths at a wavelength of 1550 nm are 28.0 and 40.0 µm for the two PCF metasurfaces, which are close to the design.

The full-width at half-maximum (FWHM) of the focal spot and the operating efficiency of the PCF metasurface with a NA of 0.37 is shown in FIG. 11 on the lower curve. The FWHM is defined as the beam waist of half maximum light intensity, which is obtained by fitting the measured cross section of light intensity at the focal spot with the Gaussian function. The measured FWHM is 2.40-2.63 µm in the measured wavelength range for the PCF metasurface with NA of 0.37.

The operating efficiency of the PCF metasurface with a NA of 0.37 is shown in FIG. 11 on the middle curve. The operating efficiency (i.e., the focusing efficiency from incident RCP to output LCP) is defined as the ratio of the light intensity of the mode profile at the focal spot to the light intensity right in front of the end facet of a reference PCF without a gold coating. The maximum efficiency of 16.1% was measured for the PCF metasurface at a wavelength of 1530 and 1540 nm. For the metasurface with a NA of 0.23, not shown, the maximum efficiency was 16.4% for the same wavelengths. The decrease of the operation efficiency with wavelength is in accordance with simulated RCP to LCP conversion efficiency from the metasurface element, shown in FIG. 3.

For purposes herein, the enhanced optical intensity of the PCF metasurfaces was defined as the ratio of light intensity integrated over the whole beam profile at focal plane to the one right after the end-facet of the LMA-PCF without a metasurface. The enhanced optical intensity is 2.34 times larger at the wavelength of 1540 nm. Even though the focusing performance is limited by operation efficiency, the light intensity of the PCF metasurface is more intense than that of the reference fiber. The demonstrated efficient in-fiber metasurface provides a controllable NA, small spot size, and enhanced optical intensity which could enhance the development of novel and ultracompact in-fiber optical imaging and communication device applications such as in-fiber lenses for laser surgery and optical fiber endoscopes, a wave-focusing element for optical fiber laser and spectroscopy, and an efficient fiber coupling for optical interconnects.

Other and further embodiments utilizing one or more aspects of the inventions described above can be devised without departing from the disclosed invention as defined in the claims. For example, different optical fiber structures with and without hollow tubes, different metasurface structures and thicknesses, diameters, shapes, angles, wavelengths, focal lengths, material and other parameters provided in this application can vary and are limited only by the scope of the claims.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. An optical fiber having a facet, comprising a metasurface coupled on the facet of the optical fiber, the metasurface having a plurality of metasurface elements configured to modulate incident light from the optical fiber through the metasurface into a geometric phase from the metasurface, the metasurface elements arranged at a plurality of progressive rotational angles relative to a datum, wherein the light can pass through the metasurface elements relative to a rotational angle of the respective metasurface element.

2. The optical fiber of claim 1, wherein the plurality of metasurface elements are responsive to applied voltage to tune characteristics of the light that passes through the metasurface elements.

3. The optical fiber of claim 1, wherein the metasurface is responsive to applied voltage to tune the metasurface to change a focal length, direction, phase shift, amplitude, wavelength, or a combination thereof of the light that passes through the metasurface elements.

4. The optical fiber of claim 1, wherein the metasurface comprises a conductor layer and wherein the metasurface element is formed through at least a portion of a depth of the conductor layer.

5. The optical fiber of claim 1, wherein the metasurface comprises a metallic layer, an insulation layer, and a conducting oxide layer, wherein the conducting oxide layer is responsive to applied voltage.

6. The optical fiber of claim 1, wherein the metasurface is configured to circularly polarize the light that passes through the metasurface elements.

7. The optical fiber of claim 1, wherein the metasurface is configured to focus the light to a focal point at a focal length from the metasurface.

8. The optical fiber of claim 1, wherein the metasurface comprises a first array row around the metasurface element with a plurality of the metasurface elements aligned at a fixed rotational angle relative to the datum.

9. The optical fiber of claim 1, wherein the metasurface is formed in one or more layers, and the one or more layers are deposited on the end facet of the optical fiber.

10. The optical fiber of claim 1, wherein the metasurface is configured to control a phase shift and amplitude change of the light through the metasurface elements to enable various optical applications consisting essentially of: wavefront engineering, radiation pattern tailoring, non-reciprocal magneto-optical effects, beam steering, and nonlinear ultrafast optical switching.

11. An optical fiber having a facet, comprising a metasurface coupled on the facet of the optical fiber, the metasurface having a plurality of metasurface elements through which light from the optical fiber can be transmitted, the plurality of metasurface elements providing geometric phase and being configured to modulate the transmitted light from the metasurface, the metasurface elements arranged at a plurality of progressive rotational angles relative to a datum, wherein the phase of the light can be modulated relative to an angle of the respective metasurface element, the plurality of metasurface elements being configured to respond to applied voltage to tune characteristics of the light being transmitted from the metasurface.

12. The optical fiber of claim 11, wherein the metasurface is responsive to applied voltage to tune the metasurface to change a focal length, direction, phase shift, amplitude, wavelength, or a combination thereof of the light that passes through the metasurface elements.

13. The optical fiber of claim 11, wherein the metasurface comprises a conductor layer and wherein the metasurface element is formed through at least a portion of a depth of the conductor layer.

14. The optical fiber of claim 11, wherein the metasurface comprises a metallic layer, an insulation layer, and a conducting oxide layer, wherein the conducting oxide layer is responsive to applied voltage to change a performance characteristic of the conducting oxide layer.

15. The optical fiber of claim 11, wherein the metasurface elements are arranged at a plurality of rotational angles relative to a datum wherein light that passes through the optical fiber can pass through the metasurface elements at the rotational angle of the respective metasurface element.

16. The optical fiber of claim 11, wherein the metasurface is configured to pass circularly polarized light.

17. The optical fiber of claim 11, wherein the metasurface is formed in one or more layers, and the one or more layers are deposited on the end facet of the optical fiber.

18. The optical fiber of claim 11, wherein the metasurface is configured to control a phase shift and amplitude change of the light through the metasurface elements to enable various optical applications consisting essentially of: wavefront engineering, radiation pattern tailoring, non-reciprocal magneto-optical effects, beam steering, and nonlinear ultrafast optical switching.

19. A method of changing incident light exiting from an optical fiber comprising:
allowing the light to pass through a metasurface having a plurality of metasurface elements formed on a facet of the optical fiber and arranged at a plurality of progressive rotational angles relative to a datum; and
changing a characteristic of the light that passes through the metasurface by:
modulating the light with a geometric phase relative to an angle of the respective metasurface element; and
tuning the characteristics of the light being transmitted from the metasurface with voltage applied to the plurality of metasurface elements.

20. The method of claim 19, wherein changing a characteristic of the light comprises changing a focal length, direction, phase shift, amplitude, wavelength, or a combination thereof of the light that passes through the metasurface elements.

21. The method of claim 19, wherein tuning the characteristics of the light being transmitted from the metasurface with voltage comprises applying a first voltage to a first set of layers of the metasurface and applying a second voltage to a second set of layers of the metasurface.

22. The method of claim 21, wherein tuning the characteristics of the light being transmitted from the metasurface with voltage comprises applying a plurality of voltages at incremental spatial locations of the metasurface.

23. The method of claim 19, further comprising converging the light that passes through the metasurface to a focal point.

24. The method of claim 19, wherein circularly polarized light passes through the metasurface elements.

25. The method of claim 19, further comprising controlling a phase shift and amplitude change of the light through the metasurface elements to enable various optical applications consisting essentially of: wavefront engineering, radiation pattern tailoring, non-reciprocal magneto-optical effects, beam steering, and nonlinear ultrafast optical switching.

* * * * *